United States Patent
Scancarello et al.

(10) Patent No.: US 10,557,464 B2
(45) Date of Patent: Feb. 11, 2020

(54) LATTICE-CORED ADDITIVE MANUFACTURED COMPRESSOR COMPONENTS WITH FLUID DELIVERY FEATURES

(71) Applicant: Emerson Climate Technologies, Inc., Sidney, OH (US)

(72) Inventors: Marc J. Scancarello, Troy, OH (US); Robert C. Stover, Versailles, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 168 days.

(21) Appl. No.: 15/366,967

(22) Filed: Dec. 1, 2016

(65) Prior Publication Data
US 2017/0184086 A1 Jun. 29, 2017

Related U.S. Application Data

(60) Provisional application No. 62/387,117, filed on Dec. 23, 2015.

(51) Int. Cl.
*F01C 1/02* (2006.01)
*F04B 39/00* (2006.01)
(Continued)

(52) U.S. Cl.
CPC .......... *F04B 39/0284* (2013.01); *F04C 29/02* (2013.01); *F04D 29/063* (2013.01); *B33Y 10/00* (2014.12); *B33Y 80/00* (2014.12)

(58) Field of Classification Search
CPC ...... F04C 18/0215; F04C 29/02; F04B 39/00; F04B 39/02; B22F 5/10; F04D 29/063; F04D 29/023
See application file for complete search history.

(56) References Cited

U.S. PATENT DOCUMENTS 4,097,195 A 6/1978 Hill
5,320,506 A 6/1994 Fogt
(Continued)

FOREIGN PATENT DOCUMENTS

CN 1118041 A 3/1996
CN 1315586 A 10/2001
(Continued)

OTHER PUBLICATIONS

International Preliminary Report on Patentability regarding International Patent Application No. PCT/US2016/065164 dated Jun. 26, 2018.
(Continued)

*Primary Examiner* — Deming Wan
(74) *Attorney, Agent, or Firm* — Harness, Dickey & Pierce, P.L.C.

(57) ABSTRACT

A light-weight, high-strength compressor component having at least one fluid delivery feature that is formed via additive manufacturing is provided. The component may have at least one interior region comprising a lattice structure that comprises a plurality of repeating cells. A solid surface is disposed over the lattice structure. The interior region comprising the lattice structure has at least one fluid delivery feature for permitting fluid flow through the body portion of the light-weight, high-strength compressor component. The fluid delivery feature may be a flow channel, a fluid delivery port, a porous fluid delivery feature, or the like that serves to transfer fluids through the component, such as refrigerant and/or lubricant oils. Methods of making such compressor components via additive manufacturing processes are also provided.

22 Claims, 22 Drawing Sheets

(51) Int. Cl.
| | |
|---|---|
| *F04B 39/02* | (2006.01) |
| *F01D 5/14* | (2006.01) |
| *F01D 5/18* | (2006.01) |
| *F04C 29/02* | (2006.01) |
| *F04D 29/063* | (2006.01) |
| *B33Y 10/00* | (2015.01) |
| *B33Y 80/00* | (2015.01) |

(56) References Cited

U.S. PATENT DOCUMENTS

| | | | |
|---|---|---|---|
| 5,556,270 | A | 9/1996 | Komine et al. |
| 5,594,216 | A | 1/1997 | Yasukawa et al. |
| 5,716,202 | A | 2/1998 | Koyama et al. |
| 5,842,842 | A * | 12/1998 | Callens ............... F04C 18/0215 418/55.2 |
| 6,841,011 | B2 | 1/2005 | Lin |
| 6,918,970 | B2 | 7/2005 | Lee et al. |
| 7,540,710 | B2 | 6/2009 | Grote et al. |
| 7,601,148 | B2 | 10/2009 | Keller |
| 7,623,940 | B2 | 11/2009 | Huskamp et al. |
| 8,104,799 | B2 | 1/2012 | Huskamp et al. |
| 8,650,756 | B2 | 2/2014 | Wadley et al. |
| 8,826,938 | B2 | 9/2014 | Moore |
| 9,605,677 | B2 | 3/2017 | Heidecker et al. |
| 10,036,258 | B2 * | 7/2018 | Mongillo ................ F01D 5/187 |
| 10,281,053 | B2 | 5/2019 | Griffin, Jr. et al. |
| 2008/0138648 | A1 | 6/2008 | Halberstadt et al. |
| 2010/0202910 | A1 | 8/2010 | Yamamoto et al. |
| 2011/0268580 | A1 | 11/2011 | Bryk et al. |
| 2012/0117822 | A1 | 5/2012 | Jarvis |
| 2012/0213659 | A1 | 8/2012 | Bayer et al. |
| 2013/0011269 | A1 | 1/2013 | Gainnozzi et al. |
| 2013/0064661 | A1 | 3/2013 | Evans et al. |
| 2013/0233526 | A1 | 9/2013 | Hislop |
| 2013/0280049 | A1 * | 10/2013 | Fisk ..................... F01D 11/122 415/173.4 |
| 2014/0010679 | A1 * | 1/2014 | Rice ........................ F04B 27/00 417/228 |
| 2014/0182292 | A1 | 7/2014 | Hudon et al. |
| 2014/0202163 | A1 | 7/2014 | Johnson et al. |
| 2015/0035392 | A1 | 2/2015 | Pal |
| 2015/0052898 | A1 | 2/2015 | Erno et al. |
| 2015/0064015 | A1 | 3/2015 | Perez |
| 2015/0080495 | A1 * | 3/2015 | Heikkila ................ B33Y 10/00 523/223 |
| 2015/0276287 | A1 | 10/2015 | Cosby, II et al. |
| 2015/0345304 | A1 | 12/2015 | Mongillo et al. |
| 2015/0345396 | A1 * | 12/2015 | Zelesky ................ F01D 5/187 60/806 |
| 2016/0082628 | A1 | 3/2016 | Yang |
| 2016/0151829 | A1 | 6/2016 | Propheter-Hinckley et al. |
| 2016/0279885 | A1 | 9/2016 | Cantwell et al. |
| 2016/0341249 | A1 | 11/2016 | Yang et al. |
| 2017/0182561 | A1 | 6/2017 | Scancarello et al. |
| 2017/0184108 | A1 | 6/2017 | Scancarello et al. |
| 2017/0234143 | A1 | 8/2017 | Snyder |
| 2018/0038385 | A1 | 2/2018 | Welch |

FOREIGN PATENT DOCUMENTS

| | | |
|---|---|---|
| CN | 1612760 A | 5/2005 |
| CN | 1643171 A | 7/2005 |
| CN | 1807090 A | 7/2006 |
| CN | 103967837 A | 8/2014 |
| CN | 104662199 A | 5/2015 |
| EP | 2762252 A1 | 8/2014 |
| WO | 2012066311 A2 | 5/2012 |
| WO | WO-2013142502 A1 | 9/2013 |
| WO | WO-2014155039 A1 | 10/2014 |
| WO | WO-2014158600 A1 | 10/2014 |
| WO | WO-2017112405 A2 | 6/2017 |
| WO | WO-2017112406 A1 | 6/2017 |
| WO | WO-2017112407 A1 | 6/2017 |

OTHER PUBLICATIONS

International Search Report regarding International Application No. PCT/US2016/065164, dated Mar. 21, 2017.
Written Opinion of the International Searching Authority regarding International Application No. PCT/US2016/065164, dated Mar. 21, 2017.
First Office Action for Chinese Patent Application No. 201680081159.8 dated Mar. 8, 2019 with English language translation provided by Unitalen Attorneys at Law, 19 pages.
Feih, Stefanie et al. "Advanced 3D metallic lattice structures for composite sandwich materials." [online] [retrieved on Sep. 8, 2018] Retrieved from the Internet: <URL: http://www.a-star.edu.sg/Portals/0/uploads/AGA/2015-ags/cambridge/Advanced%203D%20metallic%20lattice%20structures%20for%20composite%20sandwich%20materials.pdf>.
Mun, Jiwon et al. "Indirect Manufacturing of a Cubic Lattice Structure with a Copper Alloy."*Proceedings of the Twenty-Fifth annual International Solid Freeform Fabrication (SFF) Symposium—An Additive Manufacturing Conference*, Austin, Texas, Aug. 4-6, 2014. [online] [retrieved on May 12, 2015]. Retrieved from the Internet: <URL: sffsymposium.engr.utexas.edu/sites/default/files/2014-055-Mun.pdf>, pp. 665-687.
Rosen, David et al. "Design of General Lattice Structures for Lightweight and Compliance Applications." *Proceedings of the Rapid Manufacturing Conference*, Loughborough, UK, Jul. 5-6, 2006. [online] [retrieved on May 12, 2015]. Retrieved from the Internet: <URL: http://hdl.handle.net/1853/33037>.
International Search Report regarding International Application No. PCT/US2016/065167, dated Mar. 20, 2017.
Written Opinion of the International Searching Authority regarding International Application No. PCT/US2016/065167, dated Mar. 20, 2017.
International Search Report regarding International Application No. PCT/US2016/065166, dated Mar. 22, 2017.
Written Opinion of the International Searching Authority regarding International Application No. PCT/US2016/065166, dated Mar. 22, 2017.
International Preliminary Report on Patentability regarding International Patent Application No. PCT/US2016/065167 dated Jun. 26, 2018.
International Preliminary Report on Patentability regarding International Patent Application No. PCT/US2016/065166 dated Jun. 26, 2018.
"Polyetherimide (PEI): A Comprehensive Review" Special Chem, <URL: https://omnexus.specialchem.com/selection-guide/polyetherimide-pei-high-heat-plastic#>][retrieved online: Jun. 26, 2019].
First Office Action for Chinese Patent Application No. 201680081457.7 dated Mar. 15, 2019 with English language translation provided by Unitalen Attorneys at Law, 20 pages.
First Office Action for Chinese Patent Application No. 201680081473.6 dated Mar. 15, 2019 with English language translation provided by Unitalen Attorneys at Law, 19 pages.
Extended European Search Report for European Patent Application No. 16879861.9 dated Jun. 21, 2019, 7 pages.

* cited by examiner

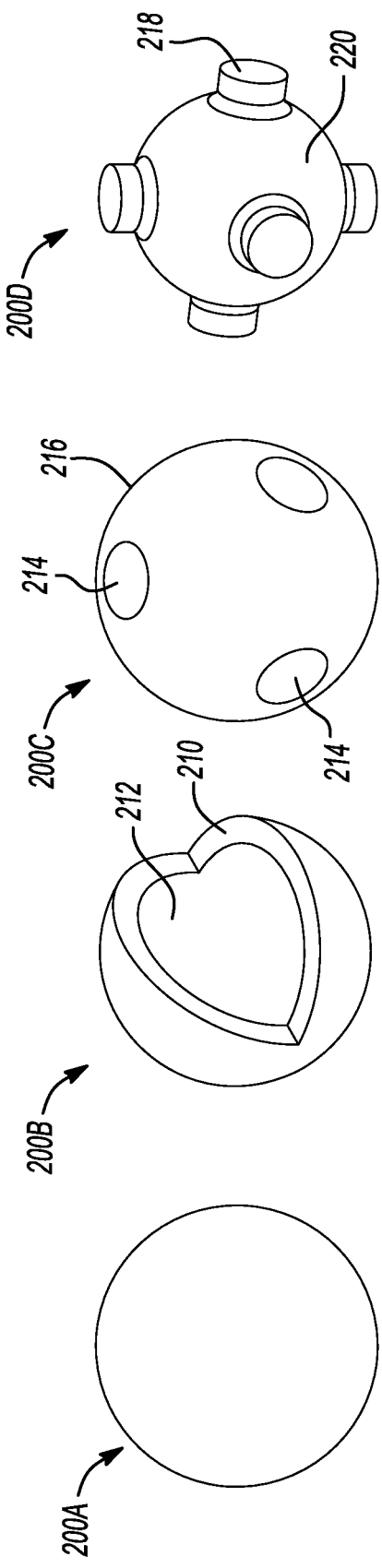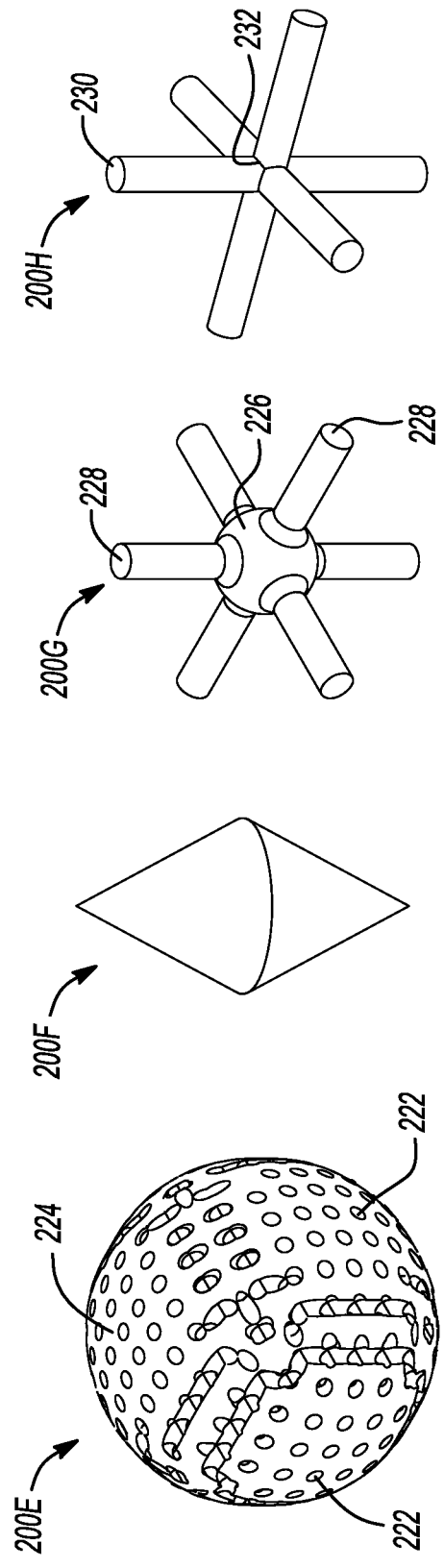

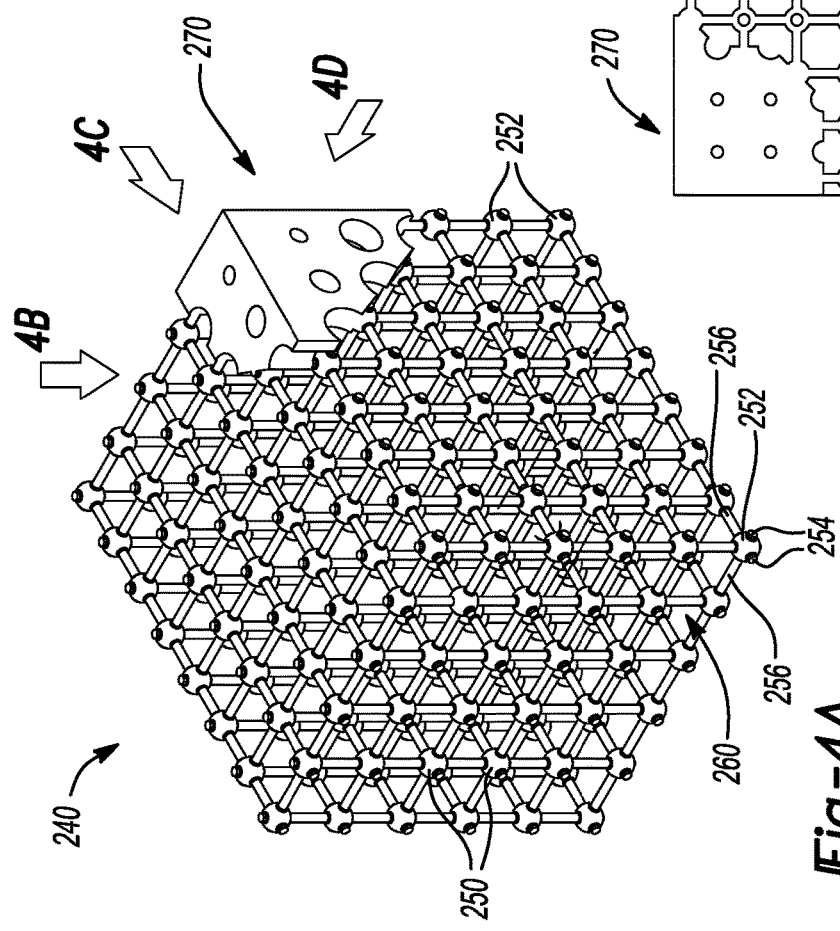
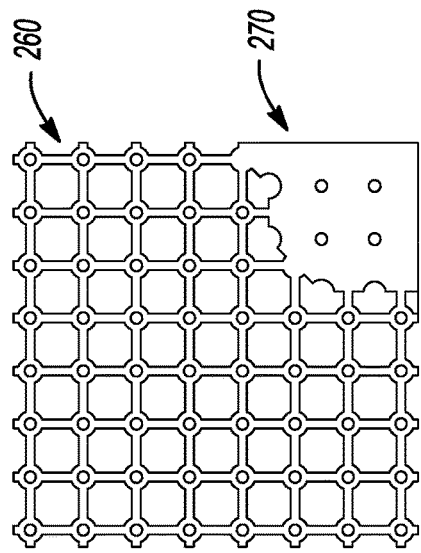
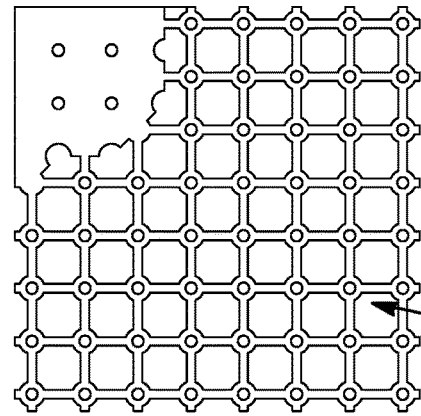
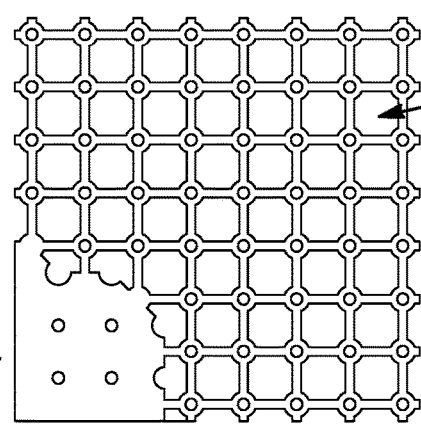

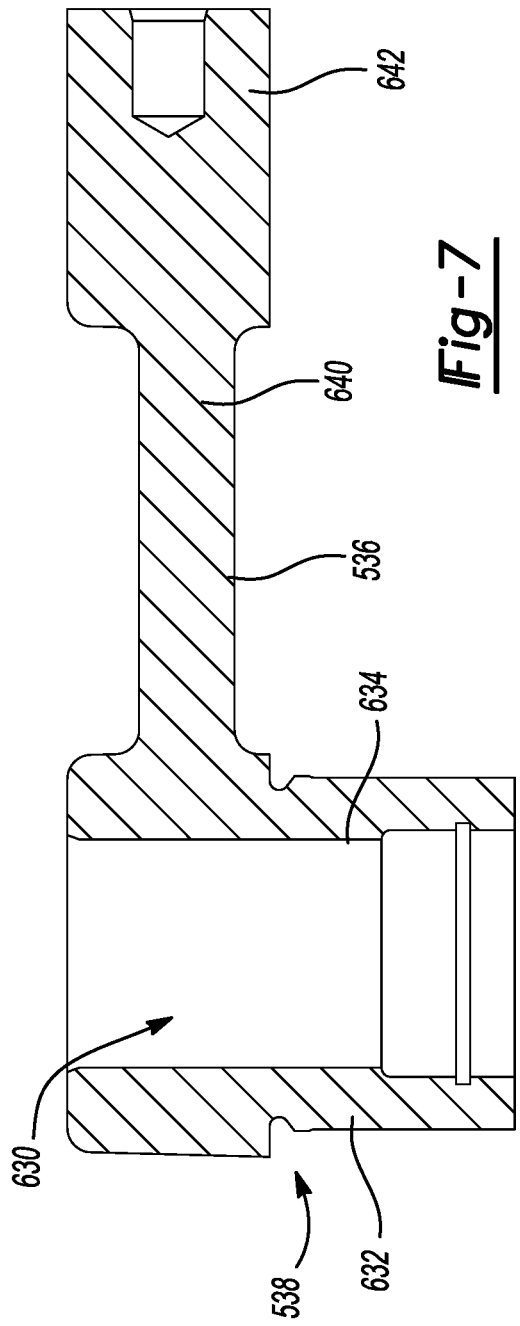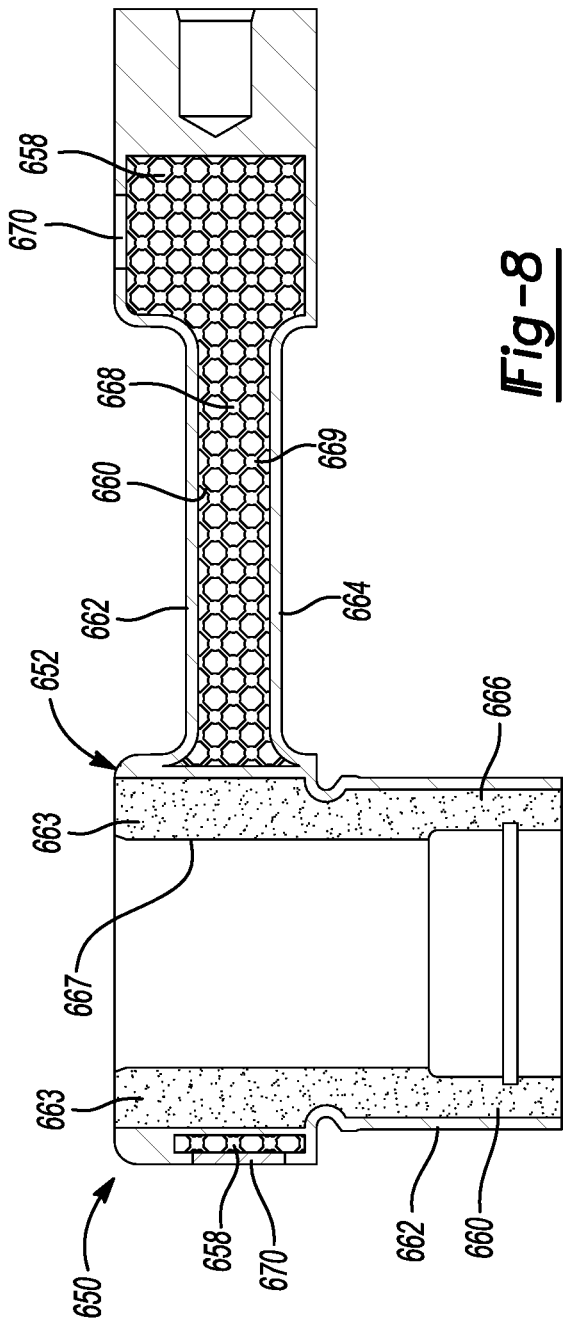

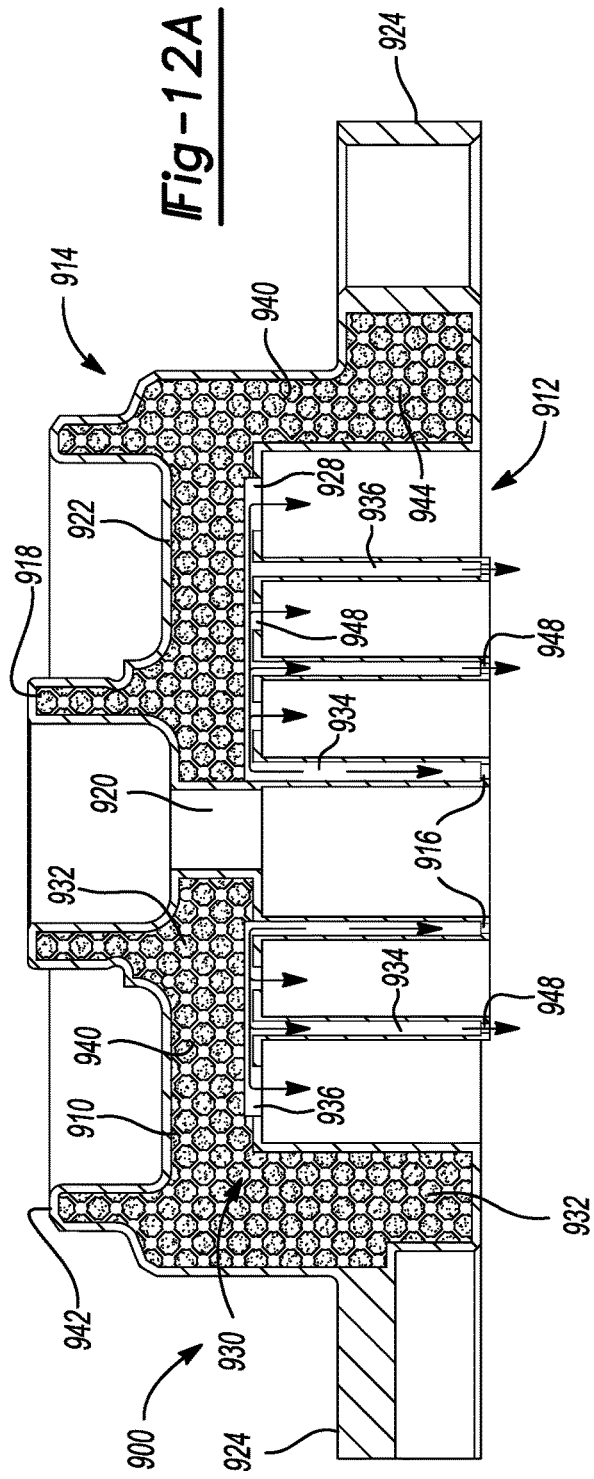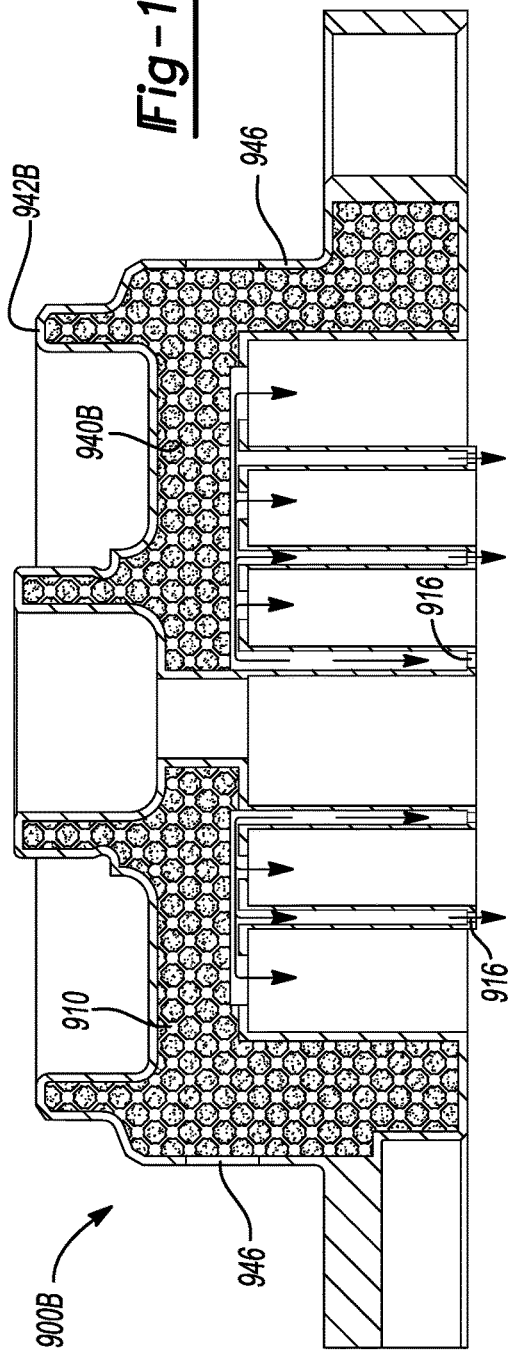

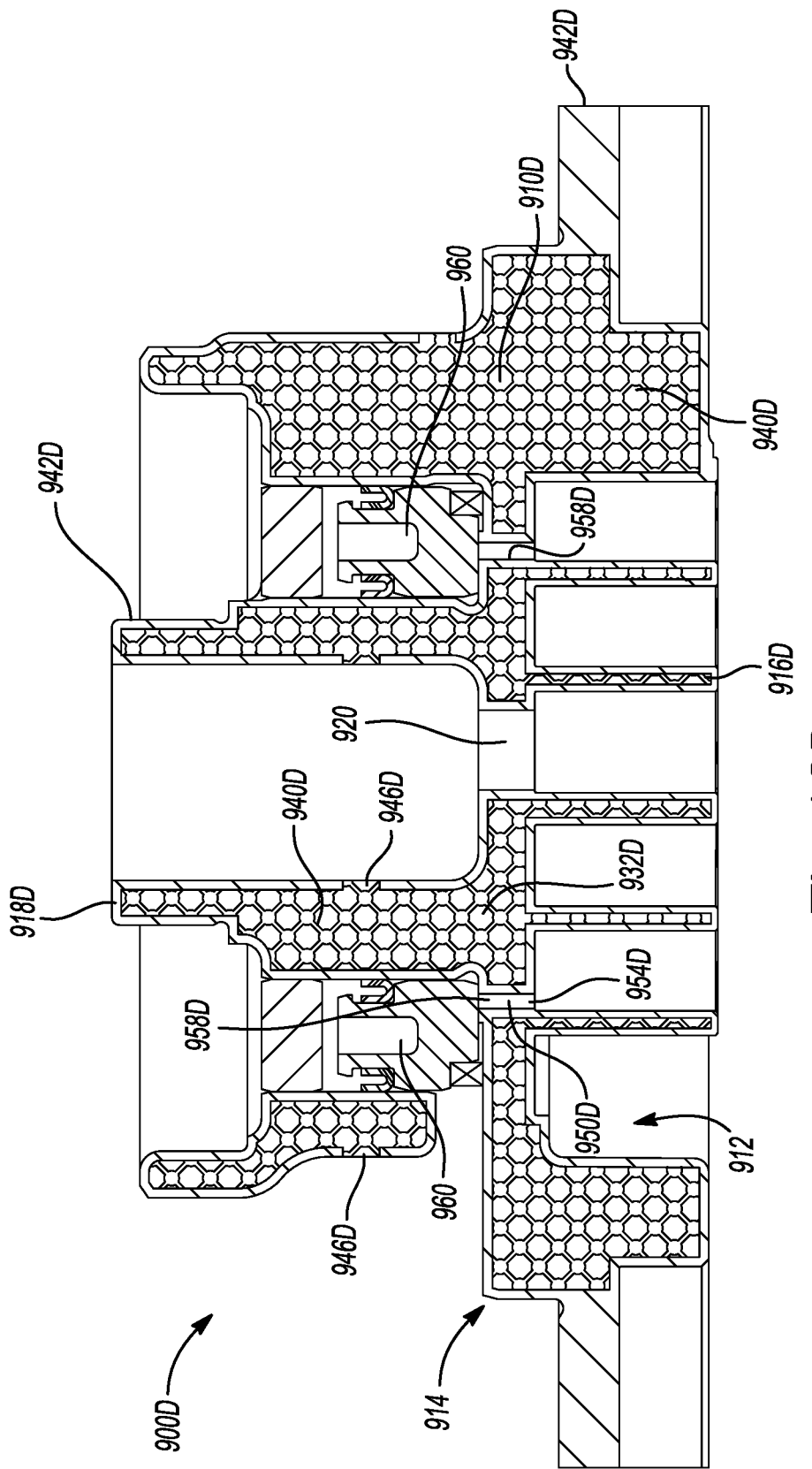

LATTICE-CORED ADDITIVE MANUFACTURED COMPRESSOR COMPONENTS WITH FLUID DELIVERY FEATURES

CROSS-REFERENCE TO RELATED APPLICATIONS

This application claims the benefit of U.S. Provisional Application No. 62/387,117, filed on Dec. 23, 2015. The entire disclosure of the above application is incorporated herein by reference.

FIELD

The present disclosure relates to improved components for compressors having integrally formed fluid delivery features created by additive manufacturing.

BACKGROUND

This section provides background information related to the present disclosure which is not necessarily prior art.

Compressors may be used in heating and cooling systems and/or other working fluid circulation systems to compress and circulate a working fluid (e.g., refrigerant) through a circuit having a heat exchanger and an expansion device. Efficient and reliable operations of the compressor are desirable to ensure that the system in which the compressor is installed is capable of effectively and efficiently providing a cooling and/or heating effect. In order to increase the operating efficiency and capacity of these types of machines, capacity modulation (e.g., variable volume ratio (VVR) systems) or vapor or liquid injection ports may be used. Such system designs often introduce fluid delivery ports and passages within select compressor components. Typical methods for manufacturing scroll components, such as billet machining, casting and forging, are not always conducive to forming various injection ports and tortuous or complex internal passages. These manufacturing methods may require assembly of separate parts and post-machining of the feature to maintain the required dimensional tolerances.

Furthermore, compressors often require reliable lubrication during operation. Typical compressors employ lubricant oils that circulate within the compressor to provide lubrication to moving parts, including various thrust surfaces. A lubricant sump may be disposed within the compressor shell to store the lubricant oil. The oil is typically intermingled with refrigerant and thus creates a working fluid processed within the compressor. The lubricant oil can flow with the working fluid through the compression mechanism of the compressor and into the discharge-pressure zone of the compressor. In the discharge-pressure zone, some or all of the lubricant is separated from the working fluid and returned to the lubricant sump. The lubricant is subsequently recycled through the compressor and may interact with the working fluid being drawn in the suction-pressure zone of the compressor. Such a system relies on adequate flow of lubricant oil to various moving parts during operation of the compressor to provide adequate lubrication.

It would be desirable to ensure adequate lubrication in the regions between moving parts that may not be exposed to high flow rates of lubricant oil, especially during high load conditions. Accordingly, it would be desirable to develop high-strength, light-weight compressor components that can have integrally formed fluid delivery features, such as complex passages and ports, to improve fluid delivery (e.g., refrigerant or working fluid, or lubricant oil) during compressor operation to improve compressor performance and efficiency and reduce manufacturing process complexity.

SUMMARY

This section provides a general summary of the disclosure and is not a comprehensive disclosure of its full scope or all of its features.

In certain variations, the present disclosure provides light-weight, high-strength compressor component having at least one fluid delivery feature. The light-weight, high-strength compressor component has a body portion with at least one interior region that comprises a lattice structure. The lattice structure comprises a plurality of cells formed via additive manufacturing. A surface is disposed over the lattice structure. The body portion also comprises at least one fluid delivery feature to facilitate fluid flow through the body portion of the light-weight, high-strength compressor component.

In other variations, the present disclosure provides a light-weight, high-strength compressor component having at least one fluid delivery feature. The compressor component comprises a body portion having at least one internal region that comprises a lattice structure formed therein. The lattice structure comprises a plurality of cells formed via additive manufacturing. A surface is disposed over the lattice structure. The interior region comprises at least one fluid delivery channel for permitting a lubricant oil to flow through the body portion of the light-weight, high-strength compressor component.

In yet other variations, the present disclosure provides a method of making a light-weight, high-strength compressor component having at least one fluid delivery feature. The method comprises applying energy in a predetermined pattern to a powder precursor to create a fused solid structure via an additive manufacturing process. The fused solid structure defines a compressor component having a lattice structure formed in an interior region. The interior region comprises at least one fluid delivery feature for permitting fluid flow through the interior region of the light-weight, high-strength compressor component.

In another variation, the present disclosure provides a light-weight, high-strength compressor component having at least one fluid delivery feature. The compressor component has a body portion comprising at least one fluid delivery feature formed via additive manufacturing that facilitates fluid flow through the body portion via the fluid delivery feature.

The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2K show a perspective view of representative distinct nodes for incorporation into lattice structures formed via additive manufacturing in accordance with certain principles of the present disclosure.

FIGS. 4A-4D illustrate varying density within unit cells of a lattice structure for incorporation into high-strength, light-weight compressor components to form regions with greater levels of reinforcement and strength. FIG. 4A is a side view of the lattice structure, while FIGS. 4B-4D are sectional top and side views.

FIG. 7 is a sectional view of a lower bearing housing assembly formed of a solid structure made via conventional manufacturing techniques.

FIG. 8 is a high-strength, light-weight lower bearing housing assembly formed in accordance with certain aspects of the present disclosure that incorporates one or more internal lattice structures and a fluid delivery feature.

Figure 9A:
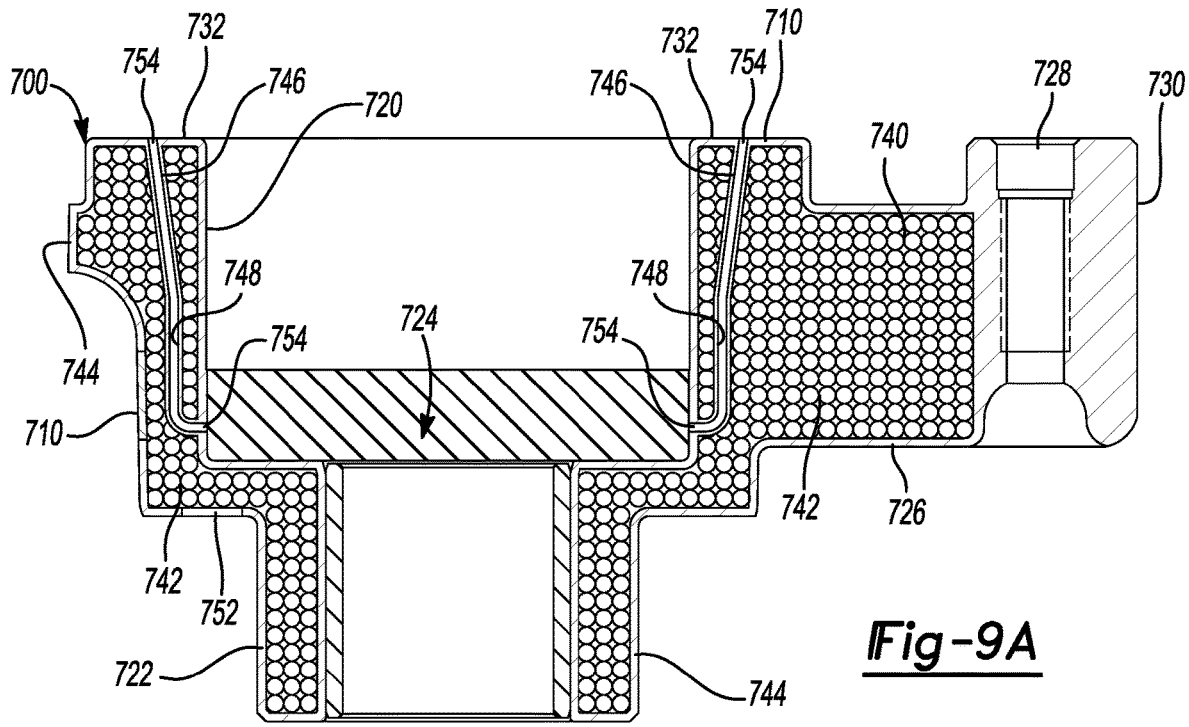
Figure 9B:
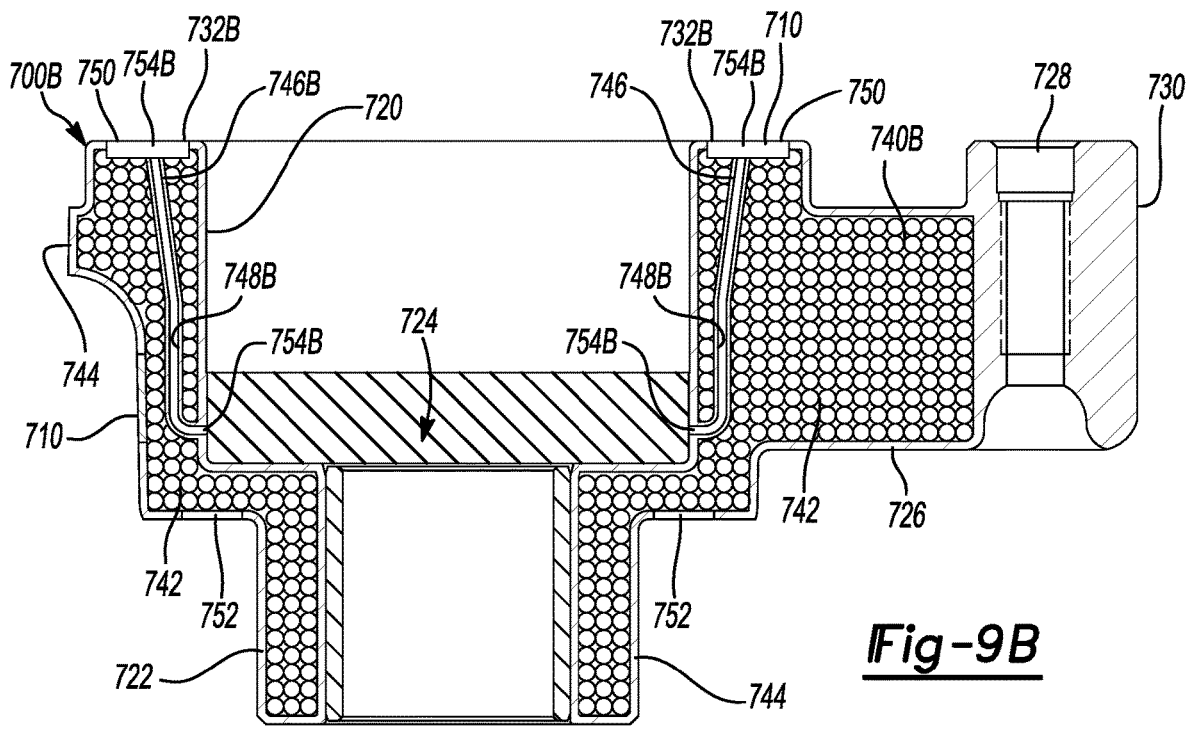
Figure 9C:
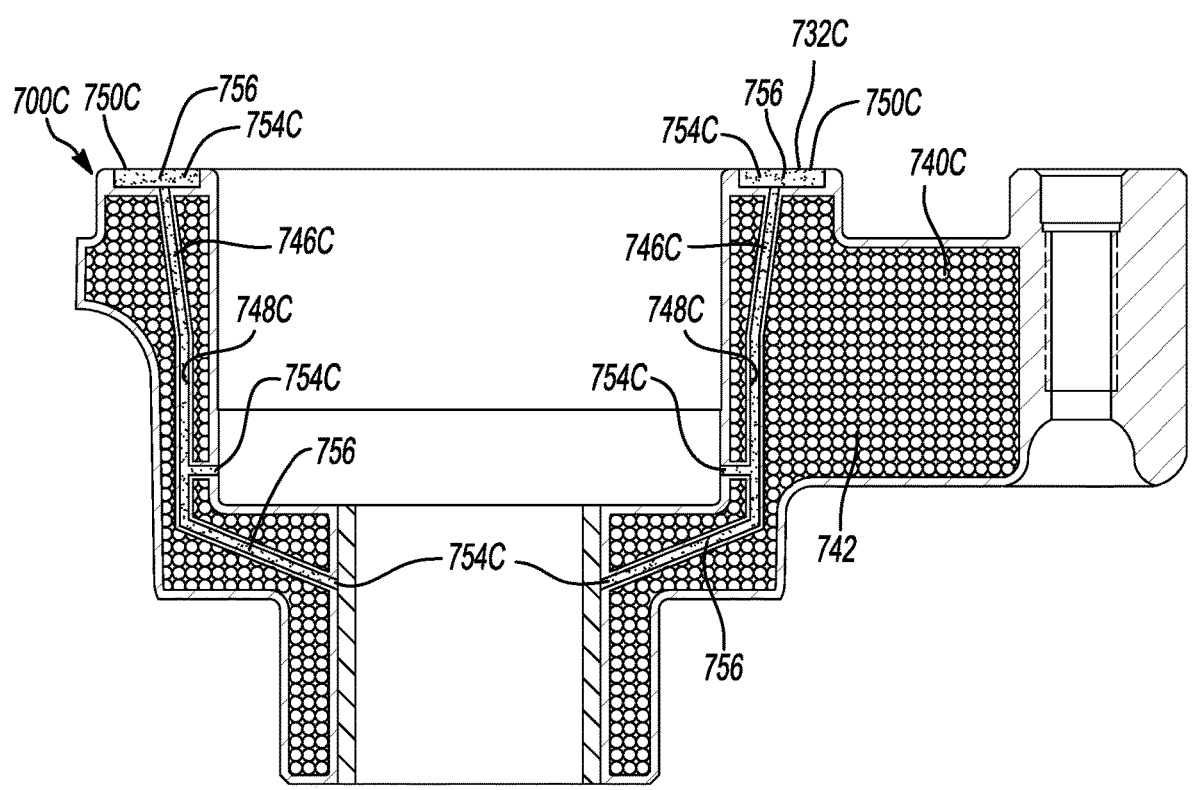

FIGS. 9A-9C show side views of a high-strength, light-weight main bearing housing having different exemplary lattice structures and fluid delivery features in accordance with certain aspects of the present disclosure. FIG. 9A shows a side sectional view of the main bearing housing having oil delivery passages to thrust surfaces. FIG. 9B shows a side sectional view of the main bearing housing having oil delivery passages that open to porous fluid delivery regions corresponding to thrust surfaces. FIG. 9C shows a side sectional view of the main bearing housing having porous oil delivery passages through the body of the main bearing housing.

Figure 10A:
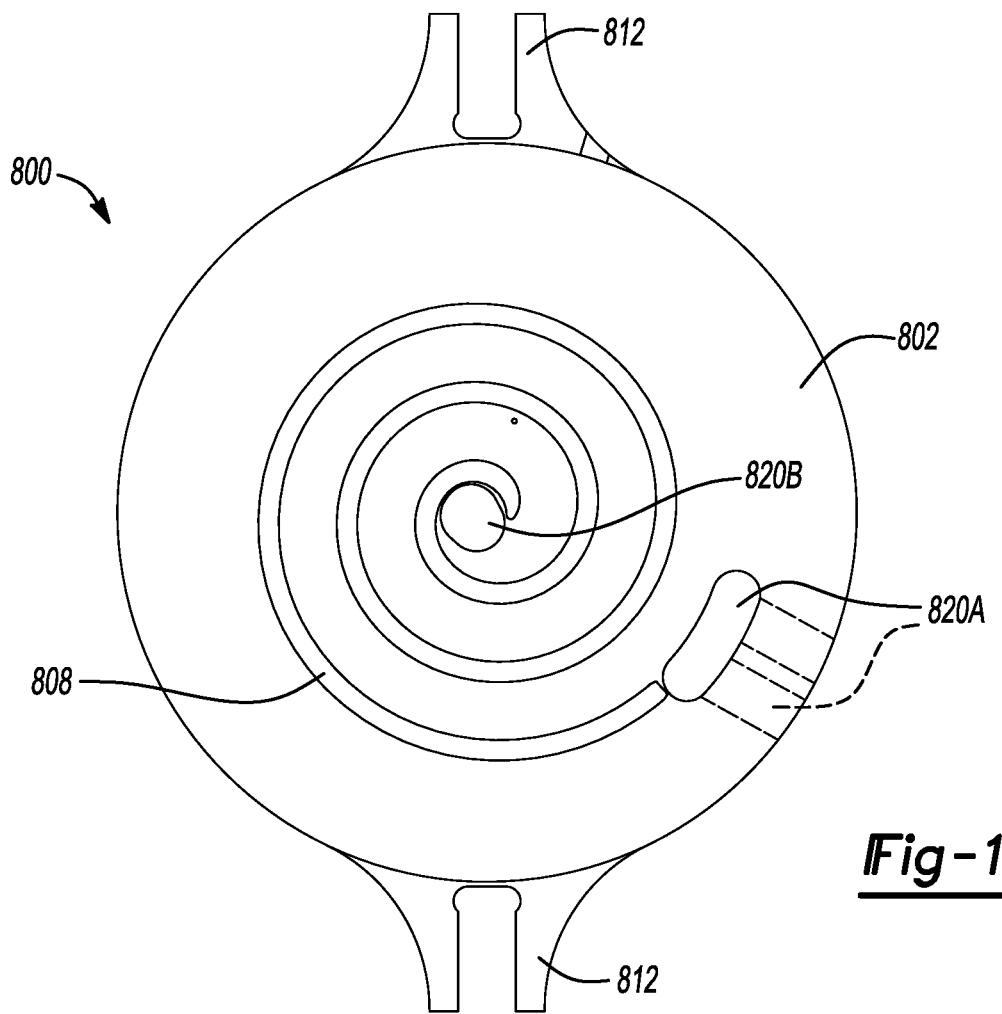
Figure 10B:
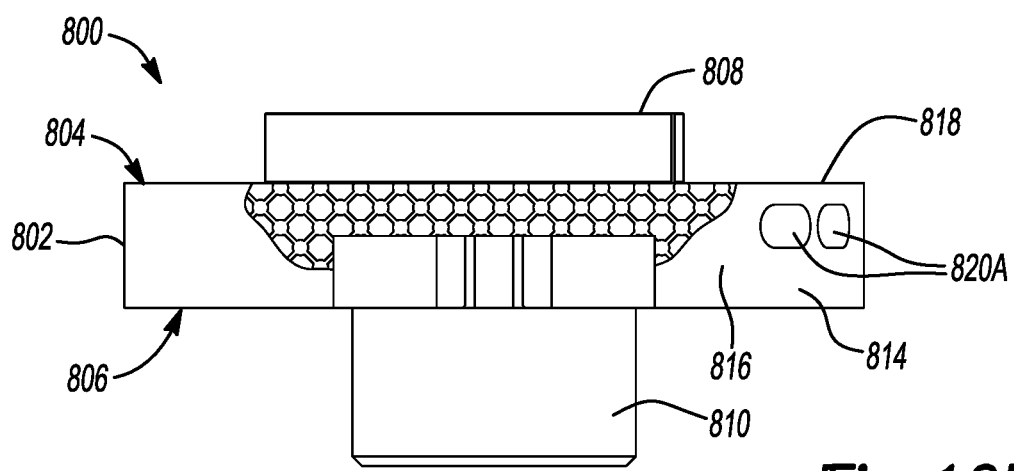
Figure 10C:
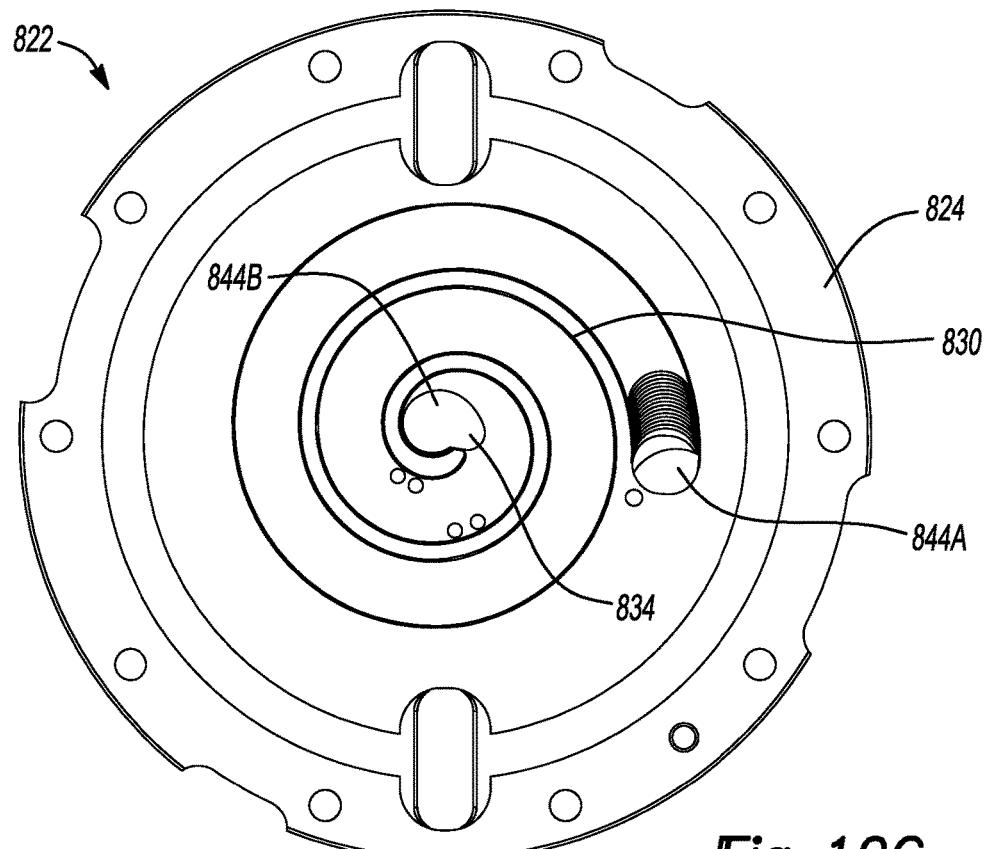
Figure 10D:
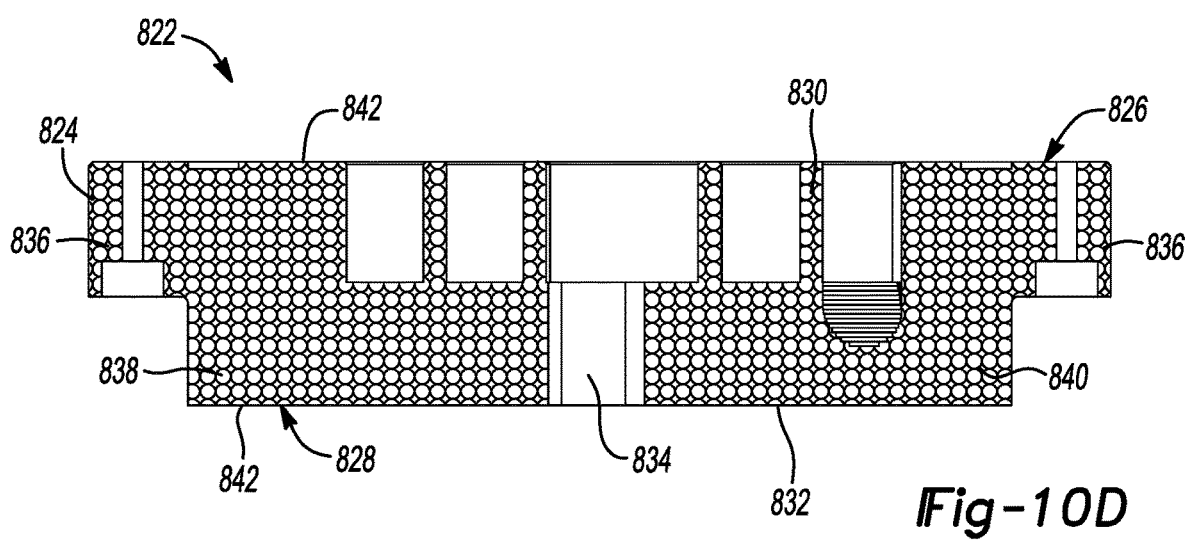

FIGS. 10A-10D show alternate variations of high-strength, light-weight scroll compressor components made in accordance with the present disclosure. FIG. 10A is a plan view of a high-strength, light-weight orbiting scroll compressor component, while FIG. 10B is a side view of the same compressor component having a lattice structure and a plurality of fluid delivery features, including a suction port and a discharge port, formed therein via additive manufacturing. FIG. 10C is a plan view of a high-strength, light-weight non-orbiting scroll compressor component, while FIG. 10D is a side view of the same compressor component having a lattice structure and a plurality of fluid delivery features, including a suction port and a discharge port, formed therein via additive manufacturing.

Figure 11A:
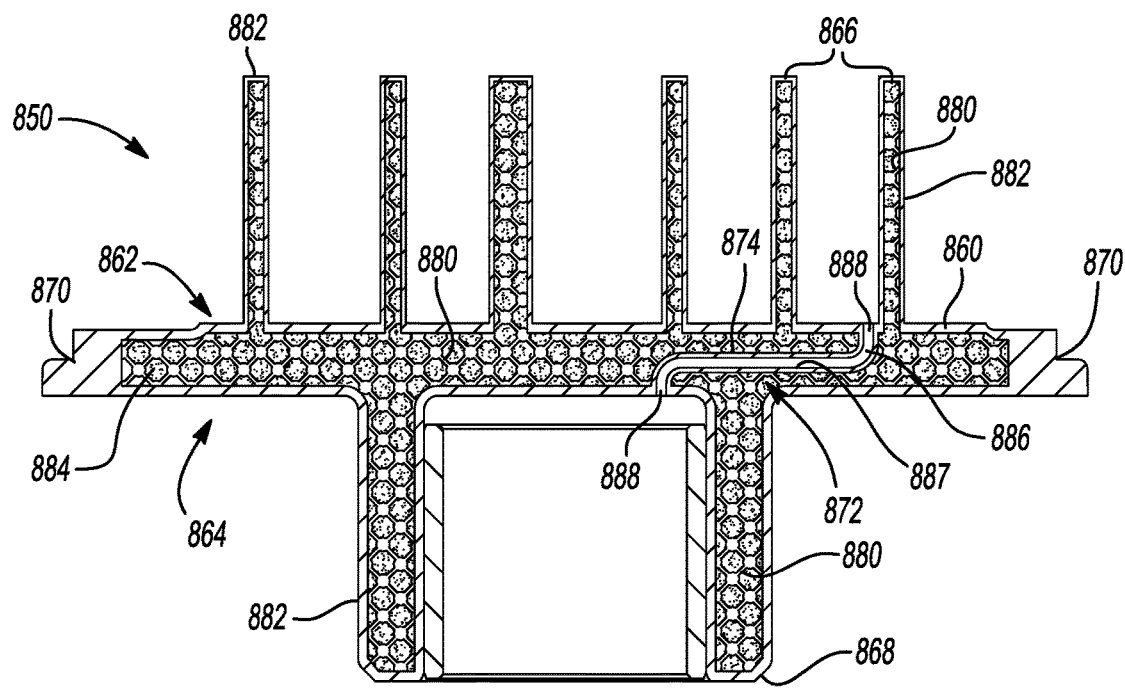
Figure 11B:
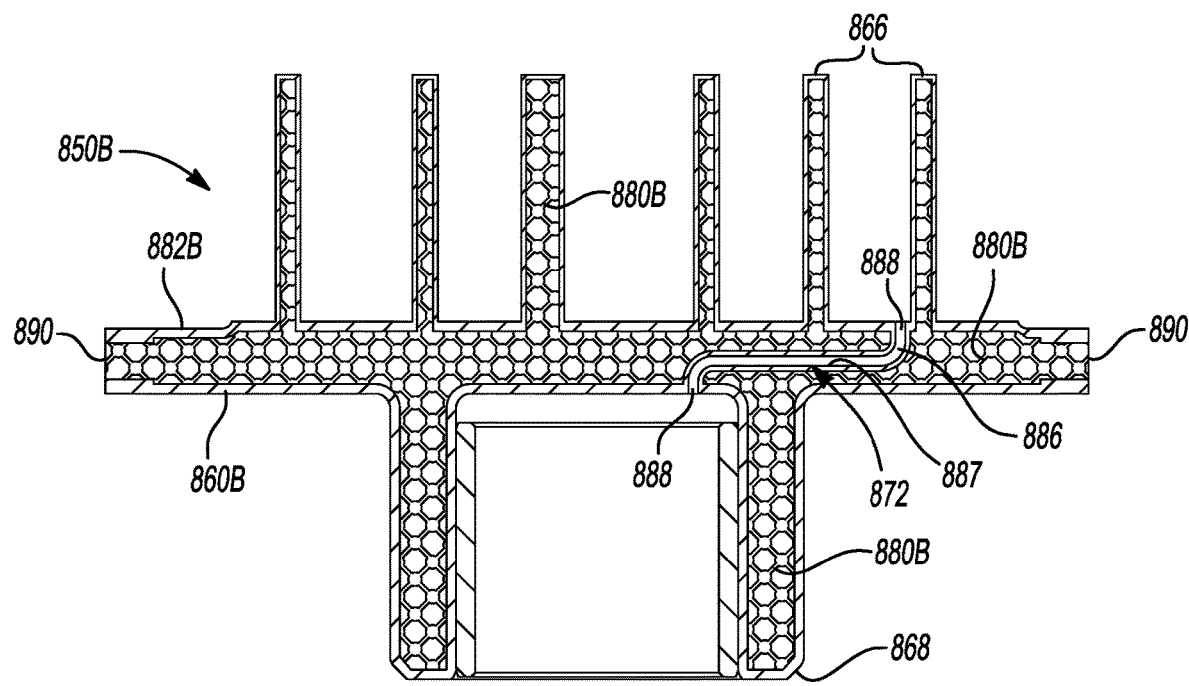
Figure 11C:
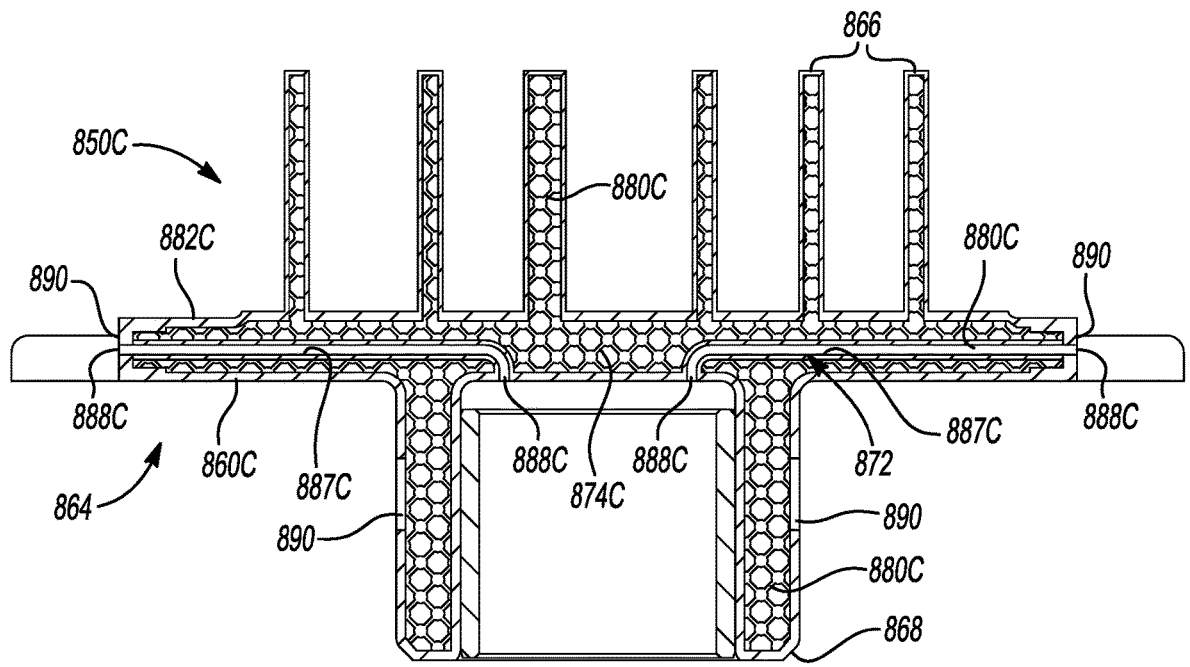
Figure 11D:
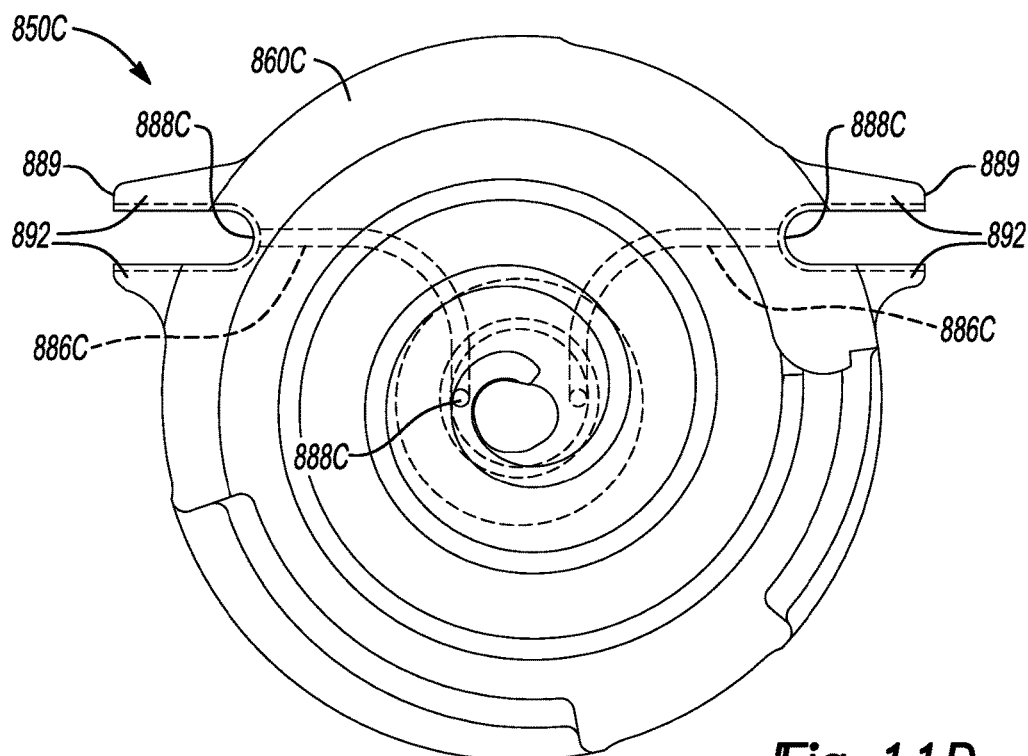
Figure 11E:
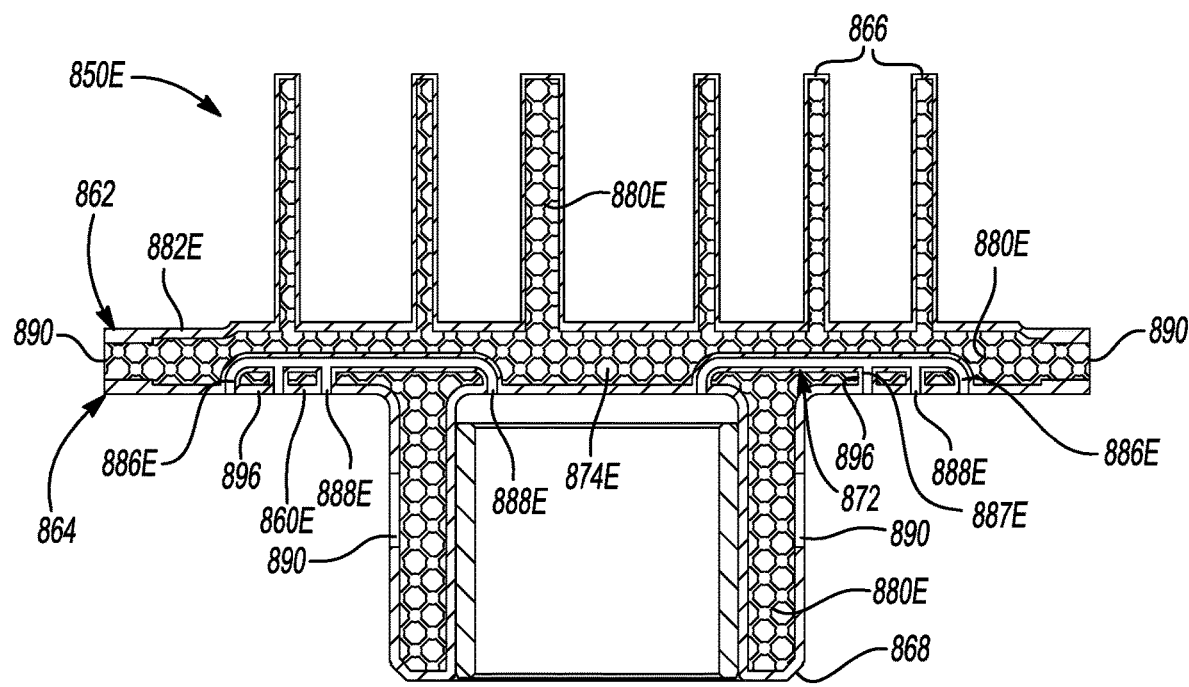
Figure 11F:
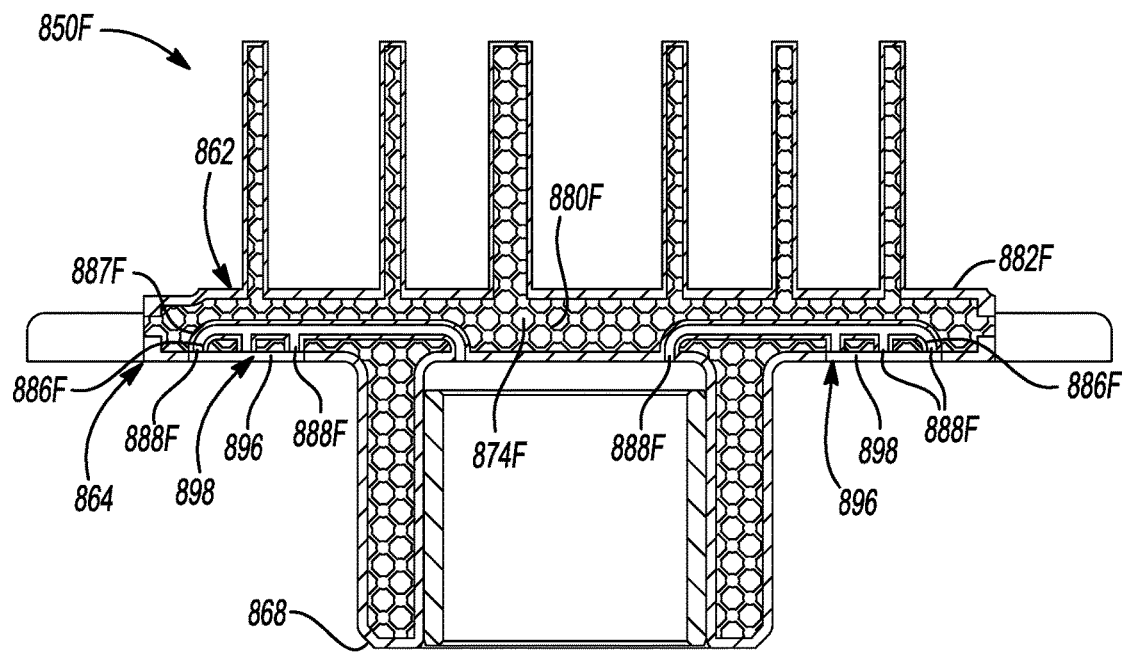
Figure 11G:
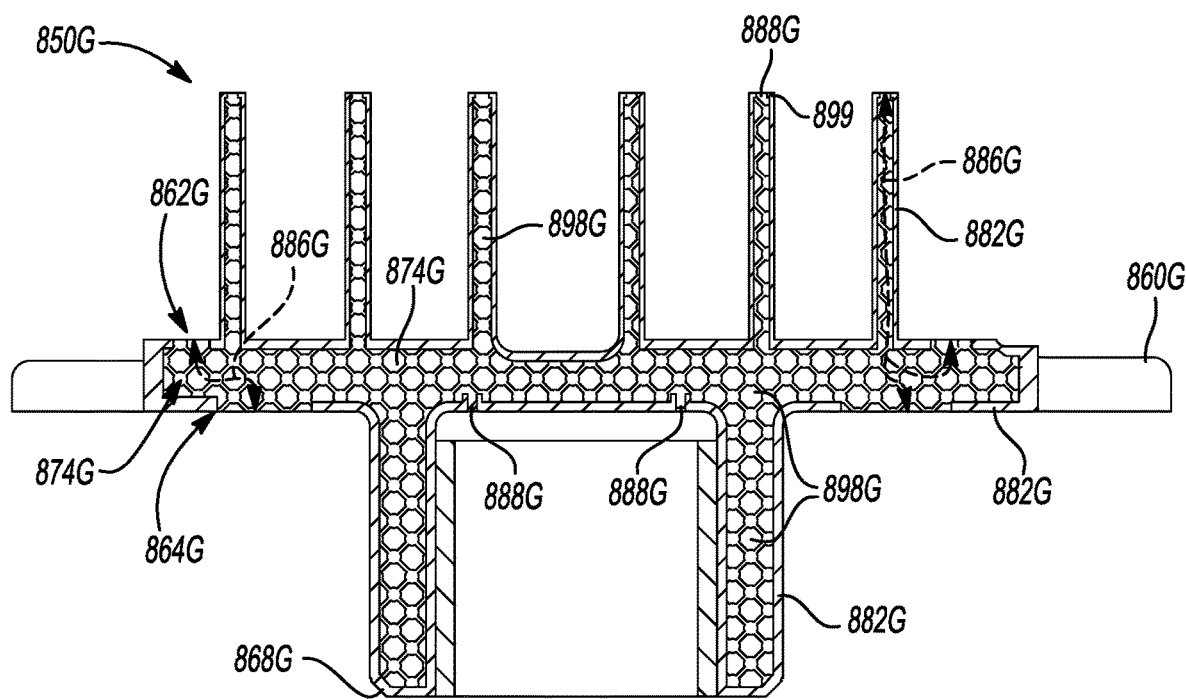

FIGS. 11A-11G show side views of alternate variations of high-strength, light-weight orbiting scroll compressor components made in accordance with the present disclosure formed via additive manufacturing and having at least one fluid delivery feature. In FIG. 11A, the high-strength, light-weight orbiting scroll compressor component has a lattice structure and an oil delivery feature for lubrication injection into the compression mechanism formed therein via additive manufacturing. A plurality of loose residual particles remains in the void regions of the lattice structure after additive manufacturing. In FIG. 11B, a high-strength, light-weight orbiting scroll compressor component also has a lattice structure and an oil delivery feature for lubrication injection into the compression mechanism formed therein via additive manufacturing, but further has removal holes disposed in a surface of the orbiting scroll component, so that after additive manufacturing, the void regions in the lattice structure may be emptied by removing loose residual particles through the removal holes. FIGS. 11C and 11D are plan and side views of an alternative variation of a high-strength, light-weight orbiting scroll compressor component that has lattice structure and at least two oil delivery passages for lubricating the interface of the Oldham coupling keys, but further has removal holes disposed in a surface of the orbiting scroll component. The void regions in the lattice are empty after removal of loose residual particles through the removal holes. FIG. 11E is a side view of yet another high-strength, light-weight orbiting scroll compressor component having a lattice structure and at least two oil delivery features for lubricating a lower thrust surface. The orbiting compressor component has a surface with removal holes, so that after additive manufacturing, void regions in the lattice are empty after removal of loose residual particles through the removal holes. FIG. 11F is a side view of an alternative high-strength, light-weight orbiting scroll compressor component having a lattice structure and multiple oil delivery features for lubricating a lower thrust surface. The oil delivery features include oil channels or passages and a porous region to facilitate even distribution of lubricant oil over the lower thrust surface. The high-strength, light-weight orbiting scroll compressor component in FIG. 11F also has removal holes disposed in a surface for removal of loose residual materials from the lattice after additive manufacturing. FIG. 11G is a side view of yet another high-strength, light-weight orbiting scroll compressor component having a fluid delivery feature in the form of porous internal passages for lubricating a lower thrust surface an upper thrust surface and the tips of the scroll member.

Figure 12C:
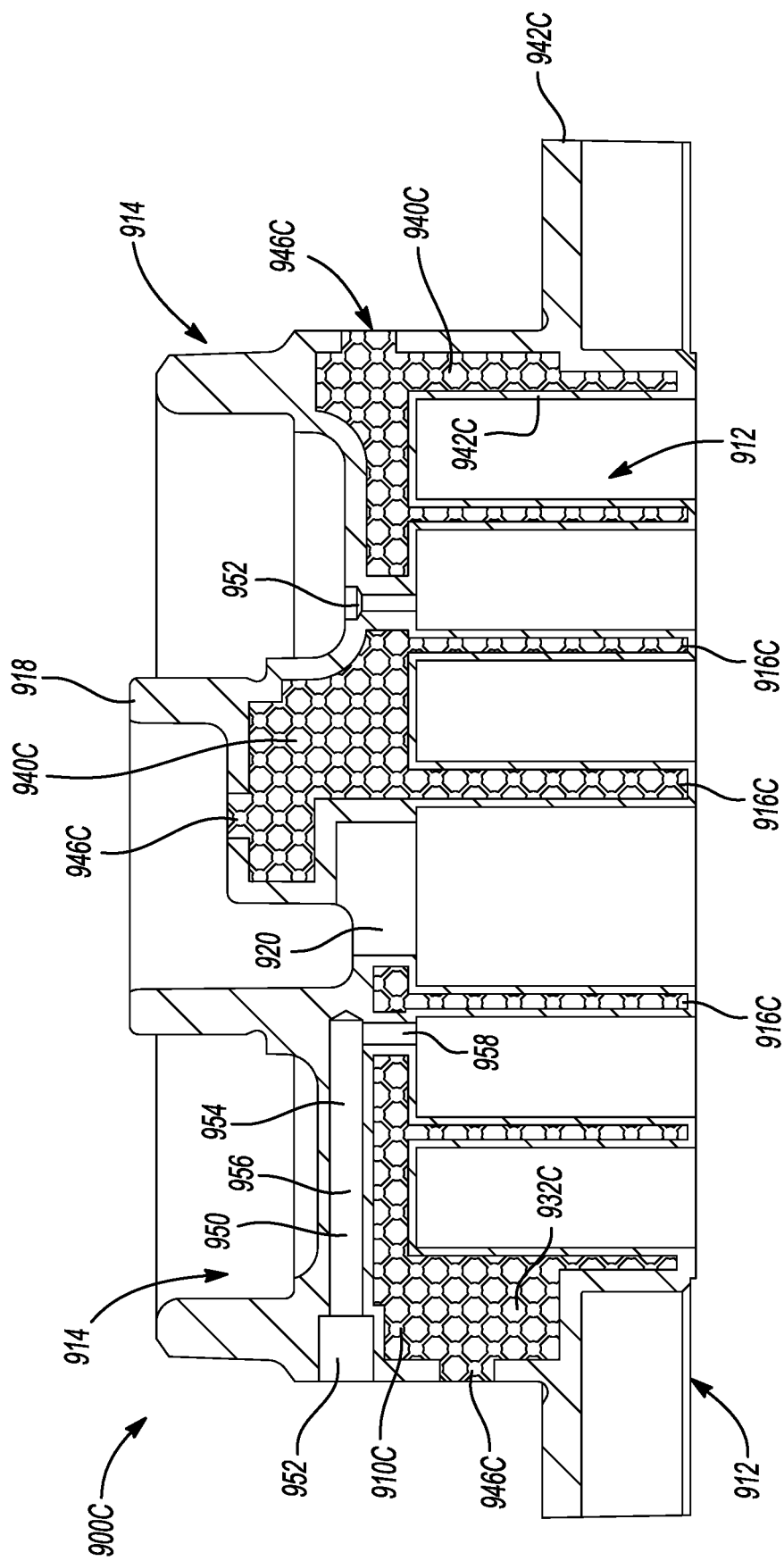
Figure 12E:
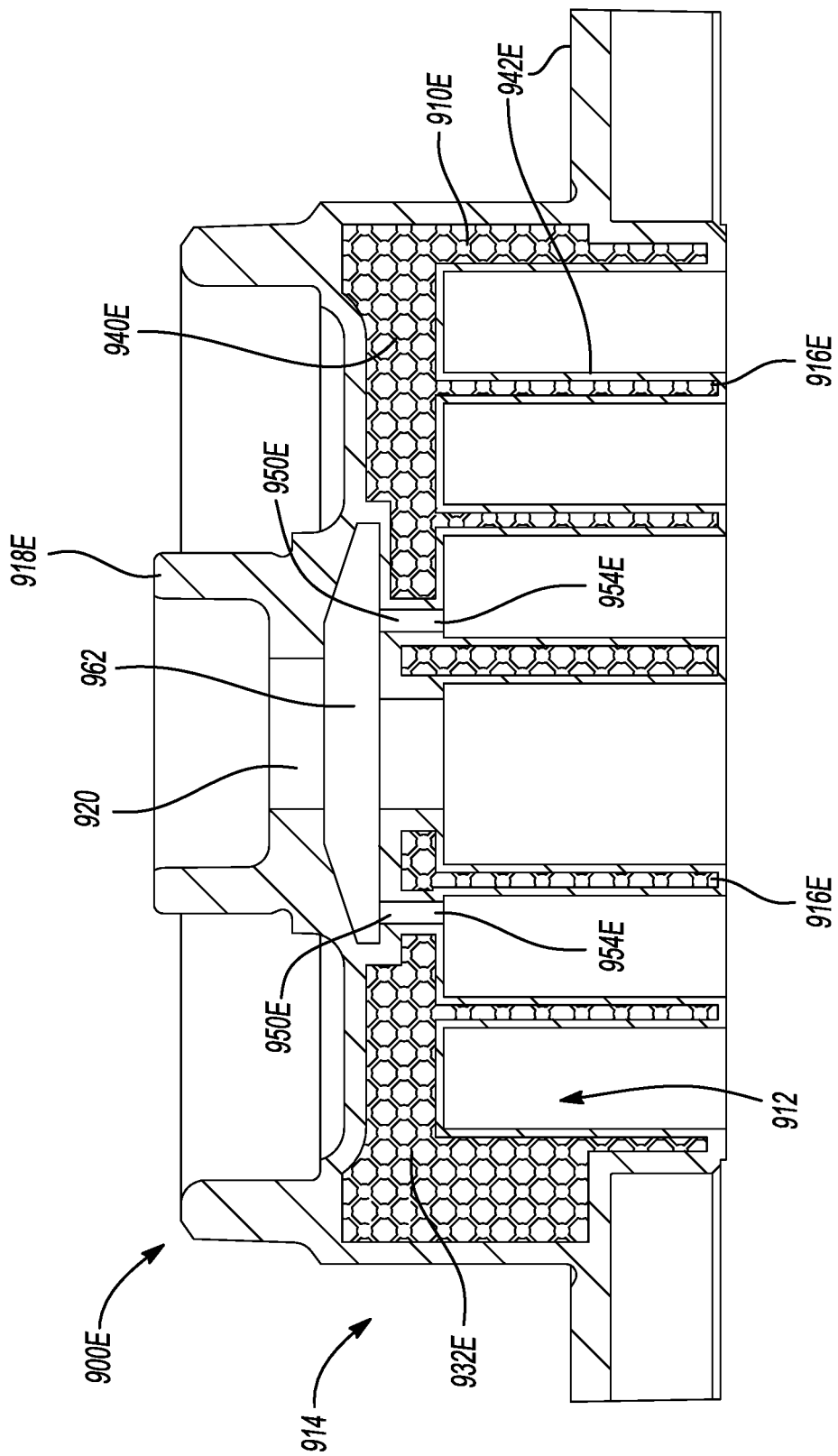

FIGS. 12A-12E show side views of alternate variations of high-strength, light-weight non-orbiting scroll compressor components made in accordance with certain aspects of the present disclosure. In FIG. 12A, the high-strength, light-weight non-orbiting scroll compressor component has a lattice structure and a porous oil delivery feature for lubrication of the compression mechanism thrust surface and tips of the scroll formed therein via additive manufacturing, where after additive manufacturing, a plurality of loose residual particles remains in the void regions of a lattice structure. In FIG. 12B, a high-strength, light-weight non-orbiting scroll compressor component also has a lattice structure and an oil delivery feature for lubrication of the compression mechanism thrust surface and tips of the scroll, but further has removal holes disposed in a surface of the orbiting scroll component. The void regions in the lattice are empty after removal of loose residual particles through the removal holes after the additive manufacturing process. In FIG. 12C, another high-strength, light-weight non-orbiting scroll compressor component has a lattice structure and a fluid delivery feature in the form of an injection port and horizontal and vertical passages for capacity modulation. The fluid delivery features and lattice structures are formed via additive manufacturing, where a plurality of loose residual particles is removed via removal holes from the void regions of a lattice structure after additive manufacturing. Yet another variation is a high-strength, light-weight non-orbiting scroll compressor component is shown in FIG. 12D, having a lattice structure and a fluid delivery feature in the form of bleed holes for capacity modulation and a discharge port. The fluid delivery features and lattice structures are formed via additive manufacturing, where a plurality of loose residual particles is removed via removal holes from the void regions of a lattice structure after additive manufacturing. FIG. 12E shows another variation of a high-strength, light-weight non-orbiting scroll compressor component having a lattice structure and a fluid delivery feature in the form of vertical fluid passages or ports into a secondary chamber for a variable volume ratio compressor design. The fluid delivery features and lattice structures are formed via additive manufacturing, where a plurality of loose residual particles is removed via removal holes from the void regions of a lattice structure after additive manufacturing.

Figure 13A:
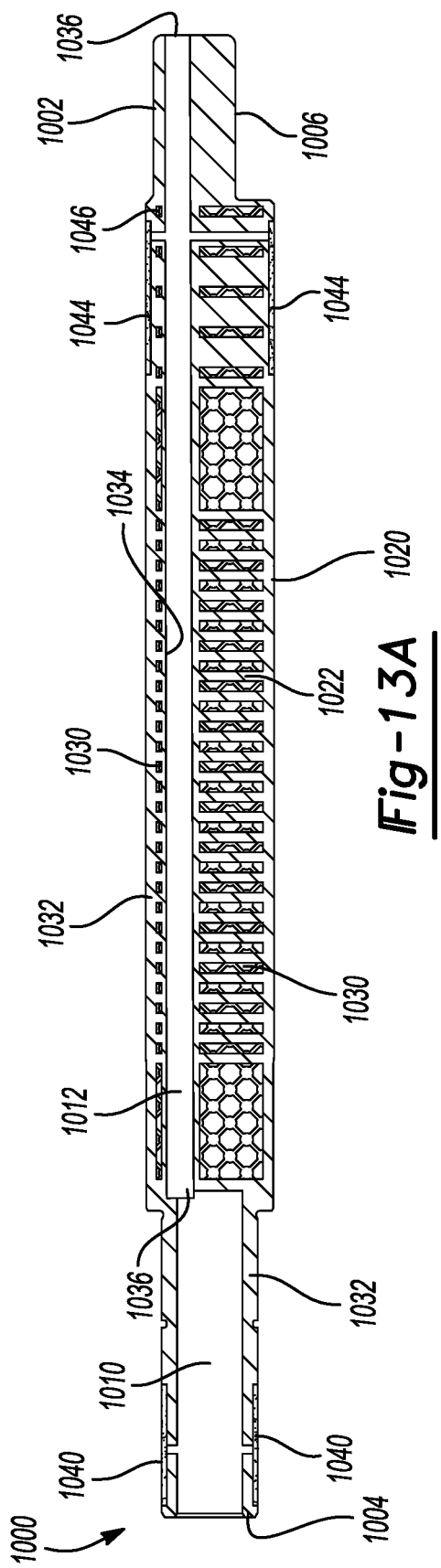
Figure 13B:
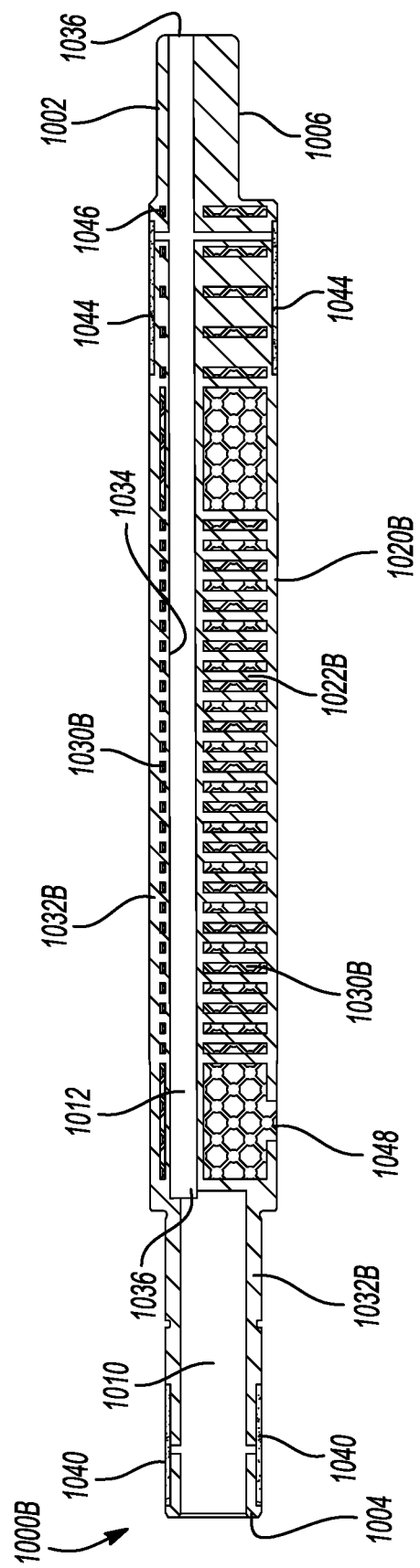

FIGS. 13A-13B show side views of alternate variations of high-strength, light-weight crankshaft compressor components made in accordance with the present disclosure. In FIG. 13A, the crankshaft has a lattice structure and a plurality of fluid delivery features, including an oil delivery passage and porous oil delivery regions in the wear surfaces that interface with the lower and main bearings as well as the unloader bushing drive flat. The lattice structure and fluid delivery features are formed via additive manufacturing, where a plurality of loose residual particles remains in the void regions of a lattice structure after additive manufacturing. In FIG. 13B, the high-strength, light-weight crankshaft compressor component has a lattice structure and a plurality of fluid delivery features formed therein via additive manufacturing similar to those in FIG. 13A, however the body portion of the crankshaft surface further has removal holes, so that void regions in the internal lattice are empty after removal of loose residual particles through the removal holes after additive manufacturing.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In various aspects, the present disclosure pertains to compressors that incorporate relatively high-strength, light-weight components that have one or more integrally formed fluid delivery features. Such fluid delivery features may be one or more ports, one or more passages or fluid flow channels, or other design features that serve to provide fluid communication through portions of a body or interior region of the compressor component. A "fluid," as used herein, includes liquids, vapors, and gases, and may include refrigerant, lubricant oil, and/or working fluid (a combination of refrigerant and lubricant oil). The fluid delivery features may be hollow or open void structures. In certain variations, the fluid delivery feature(s) may have select regions or may be entirely filled with a porous material. The at least one fluid delivery feature permits fluid flow through a body portion or internal region of a light-weight, high-strength compressor component. In this manner, the high-strength, light-weight compressor components of the present disclosure improve compressor efficiency by enabling enhanced lubrication or by forming features for efficiency promoting designs, including capacity modulation or variable volume designs or vapor or liquid injection. The compressor components have the ability to provide high-strength, light-weight parts having complex fluid delivery features to enhance compressor operation.

Figure 1:
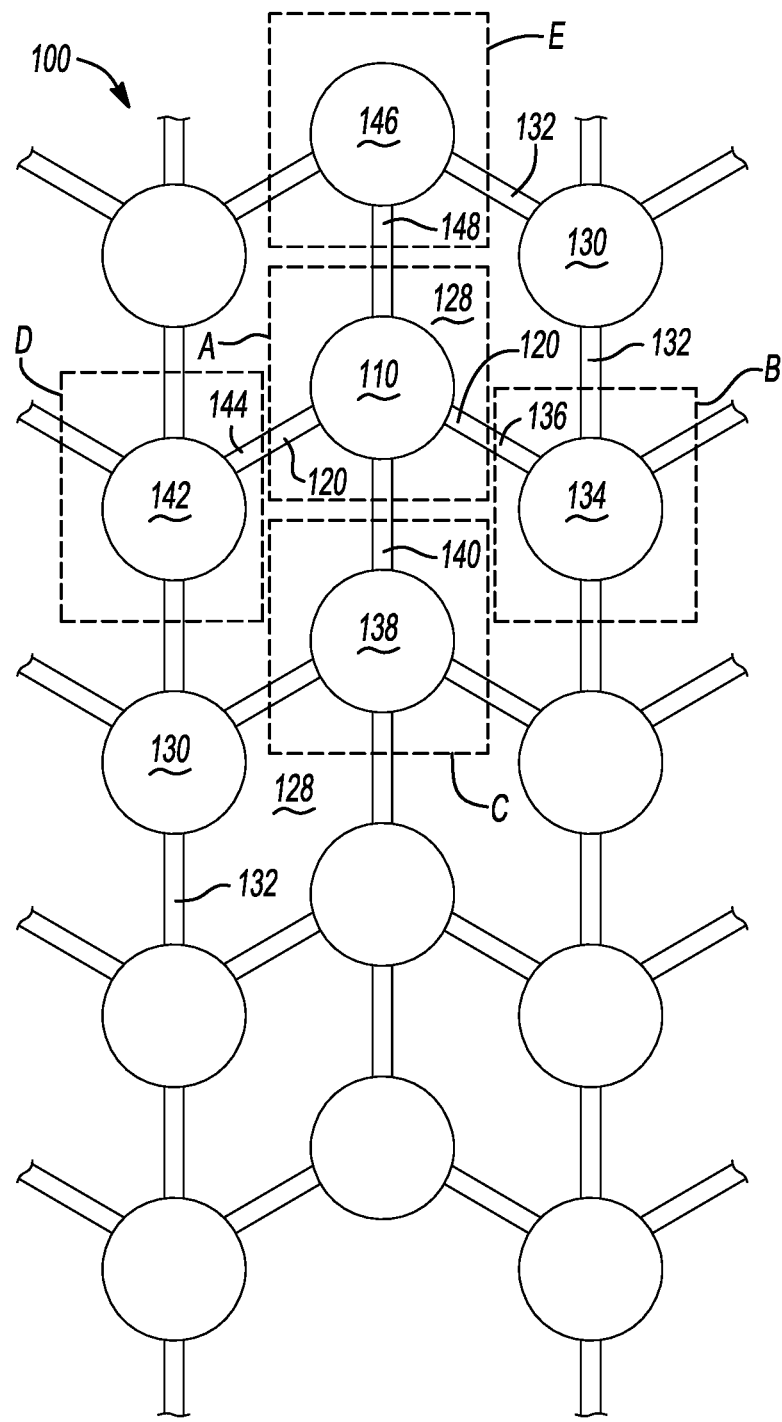
FIG. 1 shows a sectional view of an exemplary lattice structure formed via additive manufacturing in accordance with certain principles of the present disclosure.

In various aspects, the present disclosure provides a component for a compressor comprising at least one region defining a lattice structure or cellular material. In certain aspects, the region may be an internal or core region of a structural body portion of the component. An internal or core region is one that has a continuous surface formed over the lattice structure where the lattice structure would be exposed to an external environment. The component for the compressor may be an integrally formed, single piece or unitary structure, for example, a monolithic structure. Generally, a lattice structure includes a plurality of cell units that form a repeating structure. By way of non-limiting example, a two-dimensional lattice representative lattice structure 100 is shown in FIG. 1 that includes solid structures that define the lattice. The solid structures in the lattice structure 100 may include at least one node 110 and at least two connecting branches or bridge structures 120 attached to the node 110. Generally, a connecting bridge structure 120 extends between two nodes. Thus, a cell unit (marked by the outline "A") is formed that has the node 110 and the bridge structures 120. While not shown in the exemplary lattice structure 100 in FIG. 1, a unit cell may have a plurality of nodes, as well as a plurality of connecting branches or bridge structures. The cell units are regularly repeated within the lattice structure.

The lattice structure 100 may include a plurality of nodes 130 that may be interconnected with one another within a unit cell by one or more connecting branches/bridge structures 132. Such nodes 130 and connecting structures 132 are preferably formed of a solid material, such as a metal. The nodes 130 may be solid structures or may have hollow cores or interiors. In certain other variations, where the nodes or other structures within the lattice are hollow, they may be filled with a material, such as a powder. The material may also include engineered polymers, polymers including elastomers, polymeric composites having reinforcing materials and a matrix, and/or ceramics. In other variations, the hollow nodes or other structures may be filled yet other materials, such as gases or liquids, including refrigerants, oils, air, and the like, or there may be negative pressure or vacuum conditions in the hollow void regions.

The open lattice design of the lattice structure 100 is defined by the nodes 130 and connecting structures 132 and creates one or more open or void regions 128, where the solid structures are absent. Notably, the one or more void regions 128 may occupy a contiguous substantial volume of the unit cell and thus are distinguishable from a porous material having micropores or nanopores, but generally forming a solid porous structure. Notably, the solid structures in the lattice may be porous materials, but porous regions are distinguishable from the larger macroscale void regions. In certain aspects, the connecting structures may be relatively small or omitted altogether (e.g., where a plurality of nodes are in direct contact with one another, but still define regular repeating unit cells).

In certain aspects, respective cell units may be connected to one or more adjacent cell units to define an interconnected lattice structure. Thus, the connecting structures may extend from a first node within the unit cell to a second node in an adjacent unit cell. For example, in lattice structure 100 the node 110 in cell unit A may be connected to four distinct nodes 130 in adjacent unit cells. Thus, node 110 in cell unit A is connected to a first adjacent node 134 in adjacent cell unit B via a first bridge 136. Node 110 is connected to a second adjacent node 138 in adjacent cell unit C via a second bridge 140. Third adjacent node 142 in adjacent cell unit D is connected via a third bridge 144 to node 110. Lastly, a fourth adjacent node 146 in adjacent cell unit E is connected to node 110 by a fourth bridge 148. Notably, the exemplary lattice structure 100 is only shown in two dimensions; however, the nodes and connecting structures may also extend between unit cells and layers in three dimensions.

By way of non-limiting example, in certain variations, the unit cells may have a maximum dimension of greater than or equal to about 0.1 mm to less than or equal to about 10 mm and thus are referred to as "meso-structured" or non-foaming materials, having a scale generally between micro and macro scales. The number, position, size, and shape of the nodes and connecting structures in each unit cell of the lattice structure may vary, but preferably form a repeating structure that creates a cellular material.

Figure 2J:
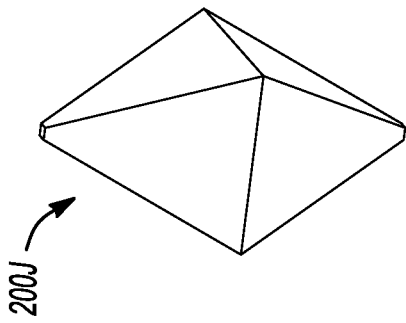
Figure 2K:
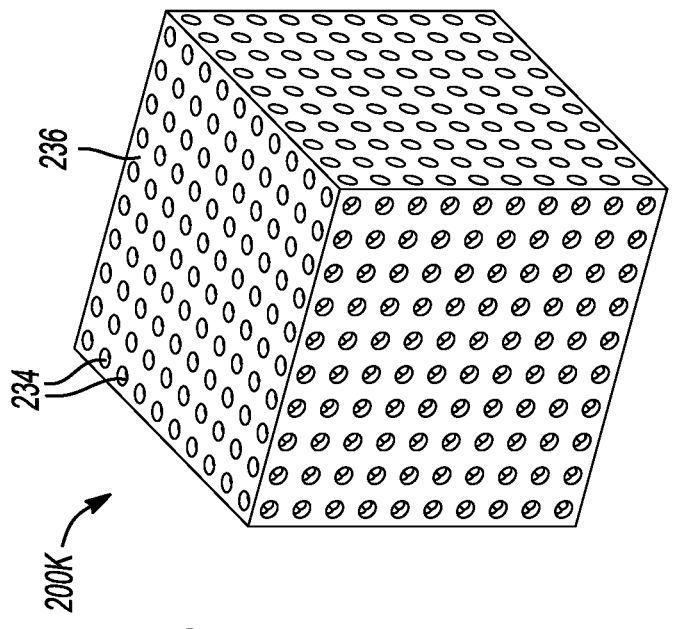
Figure 2I:
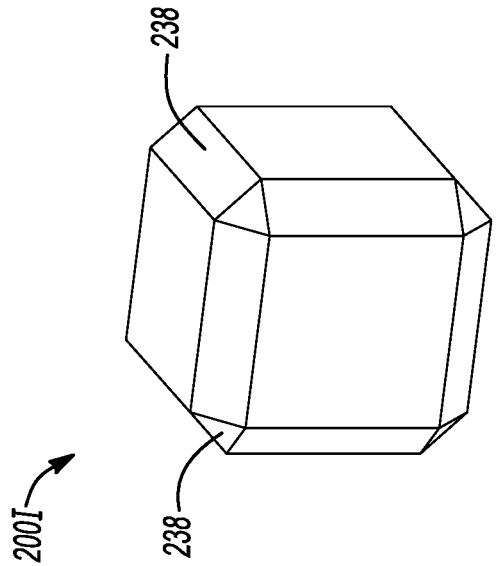

FIGS. 2A-2K show a plurality of distinct non-limiting node shapes. In FIG. 2A, a node 200A is a sphere. In FIG. 2B, a node 200B is a hollow sphere having a spherical shell 210 and a hollow interior 212. In FIG. 2C, a node 200C is a sphere with flat portions 214 disposed at regular intervals about a spherical surface 216. Notably, the number of flat portions 214 and spacing between them can vary from those shown. It should also be noted that this node can be hollow similar to node 200B. In FIG. 2D, a node 200D is a sphere that has a plurality of posts 218 disposed at regular intervals about a spherical surface 220. It should also be noted that this node can be hollow similar to node 200B. In FIG. 2E, a node 200E is a porous sphere having a plurality of small pores 222 (e.g., micropores or micropores) formed within a body 224 of the node 220E. In FIG. 2F, a node 200F has a double-cone shape. In FIG. 2G, a node 200G has a star sphere shape that includes a central sphere portion 226 with a plurality of radiating arms 228 extending from the central sphere portion 226. In FIG. 2H, a node 200H is a star having a plurality of radiating arms 230 connected to one another at a central region 232. In FIG. 2K, a node 200K has a cube shape and is porous having a plurality of small pores 234 (e.g., macropores or micropores) formed within a body 236 of the node 200K. In FIG. 2I, a node 200I has a cube shape shown with beveled edges 238. In FIG. 2J, a node 200J has a double pyramid or double diamond shape. It should be noted that a variety of other similar shapes may be used as a node, for example, a sphere is merely being representative of any round shape, including ovals or ellipsoids, and a cube may be any rectangular shape. Three dimensional polygonal or polyhedrons (e.g., hexagonal polygonal prism/honeycomb) and other more complex node shapes are likewise contemplated.

In certain variations, the light-weight high-strength compressor has a lattice structure with a cell comprising a node having a shape selected from the group consisting of: a sphere (e.g., a hollow sphere or solid sphere), a modified sphere comprising one or more flat surface regions, a sphere comprising posts, a cone, a double-cone, a pyramid, a diamond, a star, a cube, a polyhedron, an irregular asymmetrical globular shape (e.g., an irregular non-linear/globular shape like an amoeba), and combinations thereof. In other variations, the node is selected from the group consisting of: a solid sphere, a porous sphere, a hollow sphere, a hollow sphere comprising a core filled with a plurality of particles, and combinations thereof. In other variations, the node may have an asymmetrical shape and is not required to have straight-lines or symmetry. For example, an irregular/globular (nonlinear)-shaped node with a curved outer perimeter (e.g., an amoeba shape) can be used as a repeating unit throughout the lattice.

As generally understood by those of skill in the art, the design of the lattice core structures (for example, node shape, bridge/arm design, length, and angles between the nodes and bridges) can be varied depending upon the application. Specifically, the directionality of the mechanical stress is an important consideration. For example, one lattice structure optimal for reducing mechanical stress or load transfer in the plane of the component may require a different structure if the stress or load was primarily traveling in a direction normal to the component. The direction, distribution, and amount of mechanical stress applied will dictate the type of lattice structure that is optimal. Strength (e.g., resistance to torsion, tension, bending, and the like) will generally be dependent upon the orientation of the lattice relative to the direction of stress. That is, in some cases it is desirable to orient the latticework so that during deflection, the lattice is stressed in compression, which will tend to maximize the strength of the component. In other cases the reverse may be the goal, whereby more deflection is desirable (and thus less component strength).

Figure 3A:
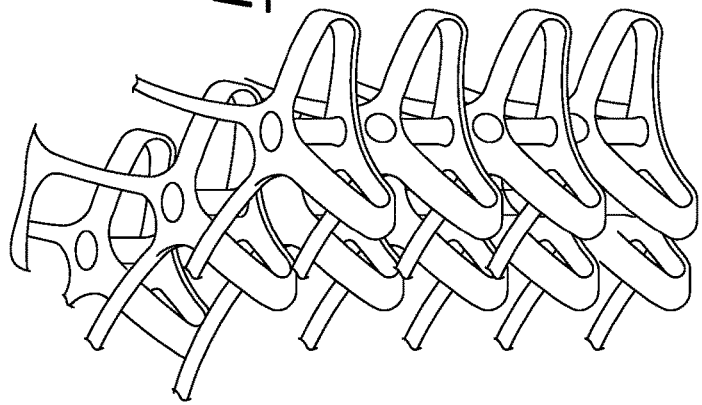
FIGS. 3A-3H show side views of exemplary distinct lattice structures for incorporation into high-strength, light-weight compressor components in accordance with certain variations of the present disclosure.
Figure 3B:
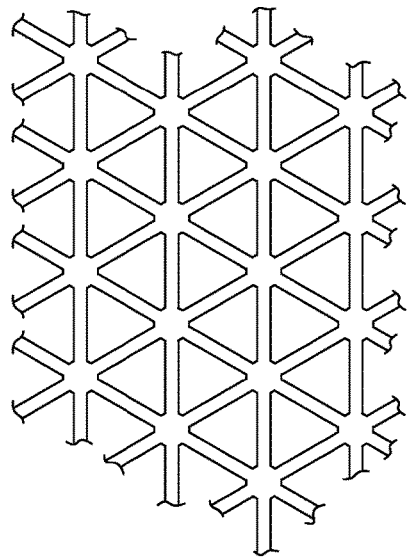
Figure 3C:
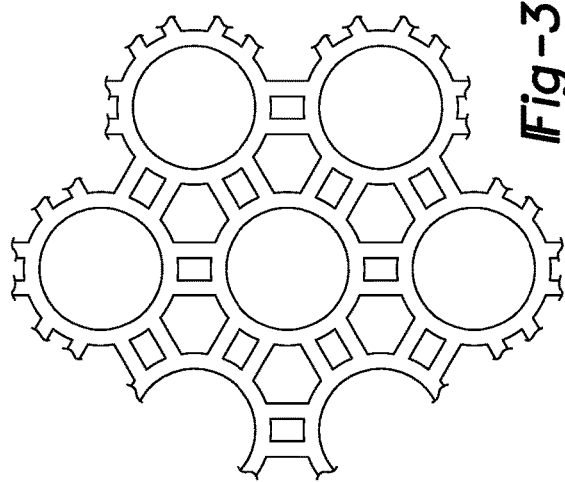
Figure 3D:
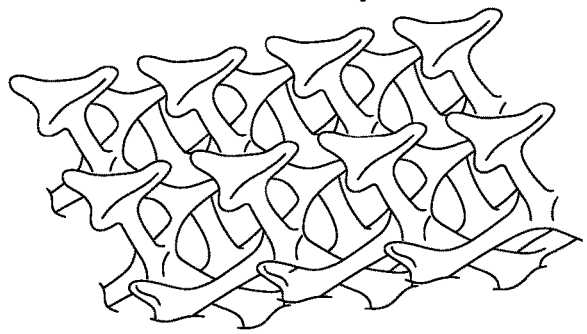
Figure 3E:
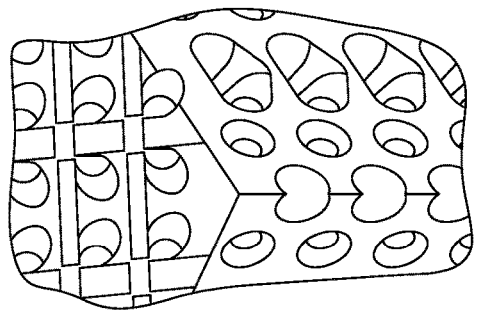
Figure 3F:
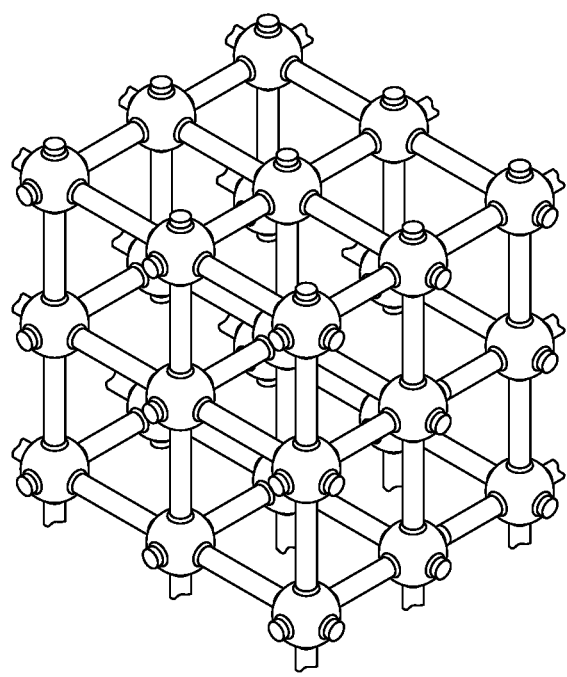
Figure 3G:
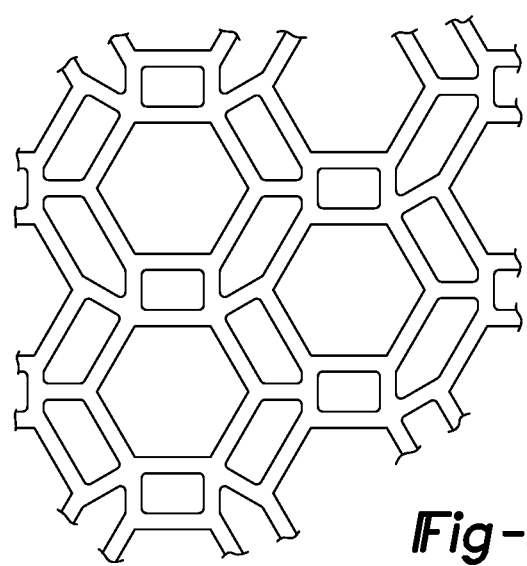
Figure 3H:
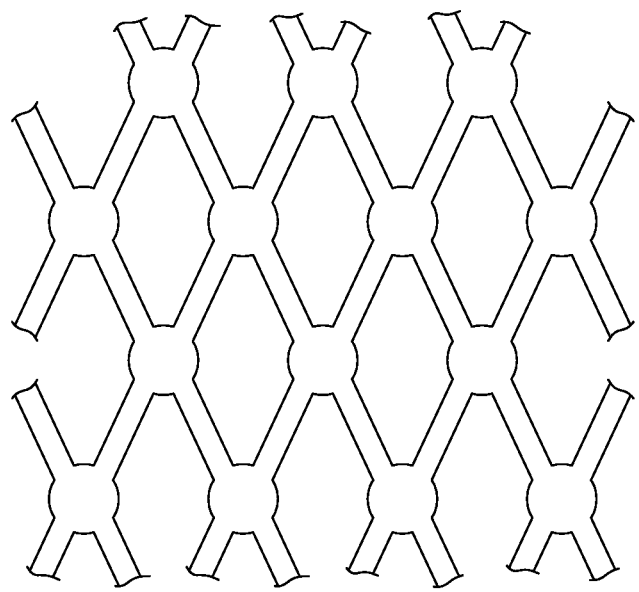

FIGS. 3A-3H show exemplary distinct lattice structures that may be employed in accordance with certain variations of the present disclosure. Notably, the respective lattice structures represent different nodes and different connecting structures within each respective unit cell that together define the lattice structure. For example, FIG. 3A represents a lattice structure that can provide high stiffness in all directions. FIGS. 3B and 3G are sphere-based lattices providing benefits associated with spherical structures. FIG. 3C is a lattice structure that can provide impact absorption, without losing lateral stability. FIGS. 3E and 3F are lattice structures that can be employed for multi-directional loading. FIGS. 3D and 3H are relatively simple lattice structures that can provide structural rigidity along with certain desired cushioning effects. These lattice structures can also provide thermal advantages. Further, while not shown, the lattice structure may be encased by a solid surface or continuous outer skin. It should be noted that a solid surface or continuous skin can also be formed on internal channels or flow structures formed internally within the lattice structure.

FIGS. 4A-4D illustrate that a density of the unit cells may be altered through the lattice structure to create regions with greater levels of reinforcement corresponding to higher density as compared to regions of lower density with somewhat less strength. In compressor components, the ability to control cell density and thus strength in certain regions is particularly advantageous, as certain select regions of the components may experience high levels of force and stress during operation of the compressor. Designed cellular materials provide an ability to only locate solid material where it is needed mechanically for a specific application.

In FIGS. 4A-4D, an exemplary lattice structure 240 is shown that has a plurality of nodes 250 formed of a sphere 252 with posts 254 (similar to the node shown in FIG. 2G). The lattice structure 240 includes a plurality of connecting bridges 256 extending between nodes 250. FIG. 4B is a top view of the structure in FIG. 4A in a direction of the arrow labeled "B," FIG. 4C is a view from behind the cube facing towards the front in a direction labeled "C," while FIG. 4D is a view from the side in a direction of the arrow labeled "D." As can be seen in a first region 260 of the lattice structure 240 the cells have a first density (having a first ratio of solid structure to void region within each unit cell). A second region 270 of the lattice structure 240 has a second density (having a second ratio of solid structure to void region within each unit cell). The first ratio is less than the second ratio, meaning the volume occupied by a solid structure in the second region 270 is greater than the volume occupied of the solid structure in the first region 260. In this manner, the second region 270 can be considered to have a higher density than the first region 260 within the lattice structure 240.

Figure 5:
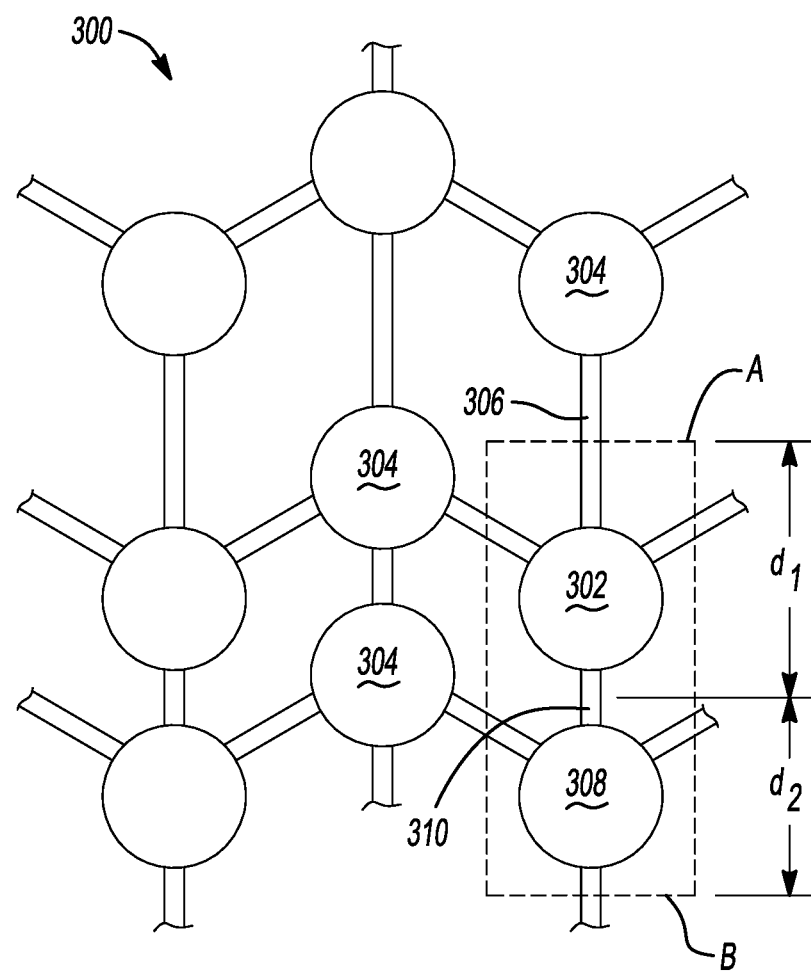
FIG. 5 shows a sectional view of another exemplary lattice structure formed via additive manufacturing in accordance with certain principles of the present disclosure, where the size of unit cells and thus cell density is varied within the lattice structure.

It should be noted that in other variations, depending upon the application, the size of unit cells may be selected to be smaller in a first region for a predetermined volume of the lattice structure as compared to a size of unit cells in other regions, so that the first region may be considered to have a higher density of cells for the predetermined volume. Such a concept is shown generally in FIG. 5, where a lattice structure 300 has a first cell unit A with a first node 302 connected to other distinct nodes 304 in other adjacent unit cells via connecting structures 306. The first unit cell A has a first dimension or length "$d_1$." A second unit cell B has a second node 308 connected to other distinct nodes 304 in adjacent cells via connecting structure 310. The second unit cell B has a second dimension of length "$d_2$." Connecting structures 306 are generally longer in the first unit cells A than the connecting structures 310 in the second unit cells B. Notably, the exemplary lattice structure 300 is only shown in two dimensions; however, the nodes and connecting structures may also extend between unit cells and layers in three dimensions. Thus, distances "$d_1$" and "$d_2$" of each cell can be varied within the lattice structure (in three dimensions) to create cells having different densities in different regions of the lattice structure. Thus, increasing the solid to void ratio within a cell is one variation of increasing density in the lattice structure, while reducing the size of the cell per unit volume and thus increasing the ratio of solid to void in a predetermined volume of the lattice is another variation of increasing cell density.

Certain non-limiting advantages of compressor components incorporating cellular or lattice regions is that they can be designed to have a high strength accompanied by a relatively low mass. Therefore, such a lattice structure region is light-weight and provides enhanced structural or compliance performance as compared to conventional bulk materials. Furthermore, when the compressor component is formed by additive manufacturing the component may be an integrally formed, single piece, unitary monolithic structure. Additive manufacturing also enables formation of highly complex near-net shapes. Additive manufacturing processes permit not only formation of lattice structures, but also formation of hollow channels or flow paths, ports, and other hollow internal regions, including those having complex and tortuous paths.

Furthermore, additive manufacturing processes enable formation of porous regions of solid material in predetermined areas of a compressor component. Such porous regions may be similar to foam materials and can be distinguished from lattice structures with repeating lattice unit patterns (each including node and bridge structures). The pores may thus be randomly disposed throughout in a porous material. In certain aspects, one or more regions of the fluid delivery features, such as fluid flow paths or channels, may be designed to be porous. The pore size may be selected to control flow rate through the fluid flow structure and thus through the component. Such a feature can be particularly desirable to regulate flow of oils to thrust and wear surfaces to draw adequate lubricant material where needed. One method to draw adequate lubrication is by capillary action. The porous material used as a fluid delivery feature may have a porosity ranging from greater than about 1% to less than or equal to about 99% and optionally having a porosity of greater than about 10% to less than or equal to about 95%. In certain aspects, the flow channels may be highly porous, for example, having a porosity of greater than about 50% to less than or equal to about 99%, optionally having a porosity of greater than about 75% to less than or equal to about 95%.

The plurality of pores within the porous regions preferably include a plurality of internal pores and external pores that are open to one another and form continuous flow paths or channels extending from an inlet to an exit. As used herein, the terms "pore" and "pores" refer to pores of various sizes, including so-called "macropores" (pores of greater than 50 nm diameter), "mesopores" (pores having diameter between 2 nm and 50 nm), and "micropores" (pores having diameter of less than 2 nm), where the pore size refers to an average or median value, including both the internal and external pore diameter sizes. The pores may thus be randomly disposed throughout while being interconnected and permitting fluid flow therethrough. Furthermore, different regions of the interior region of the compressor may have different pore densities or different pore sizes, as appreciated by those of skill in the art. Thus, the porous material may have a first region with a first average pore size (e.g., pore diameter) and a second region with a second average pore size, wherein the second average pore size is smaller than the first average pore size, for example, at least 20% smaller to demonstrate a difference in flow rate.

In fabricating the compressor components via additive manufacturing processes, one or more of the following additional advantages may be realized: the component, especially a component that is otherwise an assembly of parts, does not have mechanically fastened (e.g., bolted, screwed) or welded, bonded or otherwise fused at joints and seams; and the component itself may have a reduced cost of manufacturing, both from using potentially less expensive raw materials and also by reducing or eliminating various manufacturing and assembling steps, thus reducing attendant labor costs. This is especially true with forming compressor components having fluid delivery features integrally formed therein by additive manufacturing, as conventional manufacturing of such complex structures typically requires more expensive processing techniques that have many more processing and assembly steps.

By "high-strength," in certain variations, it is meant that the component exhibits a tensile strength of greater than or equal to about 32,000 psi (about 220 MPa), optionally greater than or equal to about 65,000 psi (about 448 MPa), in certain aspects, optionally greater than or equal to about 125,000 psi (about 861 MPa), and in certain other aspects, optionally greater than or equal to about 250,000 psi (about 1,723 MPa).

In certain aspects, the compressor component has a body portion having at least one interior region comprising a lattice structure formed via additive manufacturing. The body portion also comprises at least one fluid delivery feature for permitting fluid flow through the body portion of the light-weight, high-strength compressor component also formed during the additive manufacturing process. In certain aspects, the fluid delivery feature is an open channel for fluid communication within the compressor component. For example, an open channel may be a lubricant oil injection passage or a passage for vapor or liquid injection (e.g., of a refrigerant or working fluid comprising refrigerant and oil). In other aspects, the fluid delivery feature may be a fluid delivery port. Fluid delivery ports include bleed holes, vapor or liquid injection ports, valve placement ports, modulation ports, pressure feed ports, variable volume ratio ports, discharge ports, suction ports, and the like. In certain aspects, the fluid deliver features may include both a fluid delivery port and at least one channel. The fluid delivery port may be connected to one or more fluid channels so as to provide fluid communication within an interior region of the compressor component. Furthermore, in certain variations, at least one region of the at least one fluid delivery feature comprises a porous material.

Compressor components having such lattice structures and fluid delivery features can be formed by additive manufacturing techniques. Indeed, additive manufacturing is particularly suitable for forming compressor components having one or more complex internal fluid delivery features as provided by the present disclosure. Compressor components having lattice structure regions formed by additive manufacturing can have highly complex and freeform shapes. Certain advantages of additive manufacturing as compared to traditional formation processes, such as machining or metal molding, is that the shapes and passages formed can be conformal and quite complex (e.g., curved, tortuous). Furthermore, ports, channels, and passage features can be incorporated into the complex shape formed from additive manufacturing including the lattice structure. The ports, channels, and passages can be defined by a solid internal surface adjacent to and separated from an internal lattice structure within an interior region of the body portion of the compressor component. In addition to creating fluid delivery features and lattice structures, one or more porous regions can also be created within the interior region of the compressor component, as desired, such as within a portion of a fluid delivery feature. When present, the porous material may be formed during the additive manufacturing process (e.g., printed), may be formed after additive manufacturing as a separate foam or porous material formation process, or may be a preformed porous material introduced after the additive manufacturing process. The introducing of the preformed porous material may further include coupling or adhering the porous material to an adjacent structure.

A digital three-dimensional modeling system can be used to first form a digital model of the compressor component structure, including the desired lattice design in the one or more preselected regions, the one or more fluid delivery features, and optionally the desired porous material design in one or more preselected regions. The physical structure can then be formed from the digital model by direct or additive manufacturing. Direct manufacturing generally refers to direct formation of a scale model of a part or assembly using three-dimensional computer data.

Thus, direct or additive manufacturing techniques may be used to form complex metallic (or polymeric) structures having one or more regions with a lattice structure. Additive manufacturing techniques include direct-metal additive manufacturing processes, like powder bed fusion methods that fabricate complex metallic cellular structures by using a laser or electron beam directed over a bed of metal powder. The laser or electron beam is guided by information provided by the three-dimensional digital model to selectively sinter the metal and create the three-dimensional solid structures. Powder bed fusion processes include laser sintering, laser melting, direct metal laser sintering (DMLS), selective laser sintering (SLS), selective laser melting (SLM), selective heat sintering (SHS), electron beam melting (EBM), and LASERCUSING™ laser melting processes. Other direct manufacturing techniques that may be used for such processes include hybrid direct energy deposition (a combination of milling and laser metal deposition), binder jetting (where a liquid bonding agent is selectively deposited to join powder materials in a bed), stereolithography (SLA), laminated object manufacturing (LOM) or sheet lamination, directed energy deposition, ultrasonic additive manufacturing (UAM), fused deposition modeling (FDM), and solid ground curing (SGC), by way of non-limiting example.

In certain aspects, the present disclosure contemplates methods for making a light-weight, high-strength compressor component having one or more fluid delivery features. Such a method may include applying energy in a predetermined pattern to a powder precursor to create a fused solid structure via an additive manufacturing process. The powder precursor may be a plurality of metal particles in a bed. In certain variations, as discussed further below, the powder precursor comprises iron alloy particles or aluminum alloy particles. The predetermined pattern of application of energy may be repeated over certain areas and builds three-dimensional solid fused structures. The fused solid structure may be a compressor component having a lattice structure formed in an interior region. The compressor component also at least one fluid delivery feature formed in the interior region for permitting fluid flow therethrough. In certain variations, the fluid deliver feature(s) may include a fluid delivery channel and/or a fluid delivery port. In certain variations, the applying of energy may also form a porous material capable of permitting fluid flow therethrough. Applying energy to the powder precursor can create a sintered porous material. In certain aspects, the additive manufacturing process is selected from the group consisting of: direct-metal additive manufacturing, direct metal laser sintering (DMLS), selective laser sintering (SLS), selective laser melting (SLM), electron beam melting (EBM), stereolithography (SLA), laminated object manufacturing (LOM), fused deposition modeling (FDM), solid ground curing (SGC), and combinations thereof.

In various aspects, the one or more components fabricated by additive manufacturing processes are formed from and comprise a metal material. Suitable materials for additive manufacturing include those available as powder metals. The powder metal precursor may be pre-alloyed. Suitable metals comprise iron or aluminum, and may include iron alloys, like grey iron, stainless steel, copper alloys, tool steels, low alloy steels, titanium alloys, metal matrix composites, aluminum, or aluminum alloys, by way of non-limiting example. Such metals form structures having mechanical properties capable of withstanding stresses, torque, and high pressure conditions for long-term use in a compressor. Some suitable examples of powder metal materials are 17-4 (GP1), 17-4PH, 316L, 440C and 15-5 (PH1) stainless steels; M2, M50, H13, D2, PD1 tool steels; 4140, 4365, 8620 alloy steels; maraging steels, including MS1 maraging steel; NANOSTEEL™ composite alloys, nickel alloys, such as INCONEL™ 625 and 718 alloys and HX nickel alloy (HASTELLOY™ X); MP1 cobalt chrome, nickel copper alloys, metal matrix composites, titanium alloys, like Ti-6Al-4V, alloy 6 (STELLITE™ 6), C276 (HASTELLOY™ C), ANCORTI™ grade 5 and grade 23 as well as aluminum alloys such as AlSi10 Mg (casting grade aluminum), some of which are produced by companies such as Sandvik Materials Technology, Hoeganaes Corporation, Kennametal Stellite, and NanoSteel Corporation.

Accordingly, the present disclosure contemplates a compressor component including at least one region defining a lattice structure or cellular material. In certain aspects, such a compressor component may be considered to have a lattice core. By using additive manufacturing processes, the production of compressor components having an internal lattice structure with a solid surface layer is provided. The internal lattice structure can be designed and optimized to provide rigidity and strength. The design of the lattice also allows for weight reduction in such a component as compared to components formed from conventional formation techniques, due to the void regions in the lattice. This combination therefore provides a strong and lightweight component. In addition to providing high strength and lower weight components, one or more fluid delivery features are also formed within the compressor component to facilitate fluid flow through the interior region of the compressor component, also affording improvements in compressor operation, including better lubrication and higher efficiency. The one or more fluid delivery features may be defined by an internal solid surface layer within the compressor component disposed within the lattice structure.

In certain variations, the fluid delivery feature may comprise a porous material. The porous material may be created during the additive manufacturing process as part of the fluid delivery feature. In certain other variations, the porous material may be created or introduced into the interior region of the compressor component after the additive manufacturing process that creates the lattice structure and a solid surface layer. Some examples of porous materials might include those formed from polymer fibers, silicones, ceramics, open cell foam materials, and the like.

In certain aspects, the present disclosure pertains to compressors that incorporate relatively high-strength, lightweight components that can have enclosed lattice structures within one or more regions of a body of the part that have a fluid, such as gas or fluids (e.g., air), filling the void regions or a reduced pressure or vacuum within the one or more void regions. In such variations, it is desired to include a solid surface layer between the lattice structure and any fluid delivery passages formed within the compressor component.

After powder removal from additive manufacturing, a liquid, a gas, a gel, or other substance can be introduced into the void regions of the lattice structure to further modify the final properties of the component. Such a technique may be especially useful for modifying and further improving sound reduction or thermal transfer properties by this approach (e.g., reduction in sound transmission). In certain variations, the liquid be a polymeric precursor that cures after filling the void regions to either become a hard solid or an elastic solid (rubber) or even a gel. In other variations, a solid filler material may be disposed in the void regions to provide sound or vibration dampening. The solid filler material may be powder metal, for example, the unsintered raw material that remains intact after the additive manufacturing process.

The latticework in the lattice structure can be designed to intrinsically supply an open and possibly porous structure; however, in certain variations, additional materials that modify the lattice structure can be used to enhance or regulate fluid delivery. Such materials may be added to the lattice structure (e.g., filling voids within the lattice structure) or disposed on internal surfaces of the lattice structure. Thus, in certain variations, the present disclosure contemplates at least one surface region of the fluid delivery feature comprising a coating. For example, internal surfaces of the lattice structure defining the fluid delivery feature can be treated with such materials after formation via additive manufacturing (e.g., to form a coating or layer on one or more regions of the internal surfaces of the lattice structure). Such treatments generally require access to the inside of the lattice structure to make contact with internal surfaces of the lattice structure. For instance, in one variation, a treatment or coating may be disposed on the surface of the pores defined within the porous material or along the nodes and connecting structures bridges of the lattice structure that creates either increased or decreased "wetting" of the fluids (aqueous or non-aqueous fluids, including oils, refrigerants or any other heat exchanging fluid). The level of wetting can be preselected or tuned based on the coating composition and physical nature of the interior pore or lattice cell surfaces. Omniphilic coatings increase wetting of polar and non-polar fluids on a surface, while omniphobic coatings decrease wetting for both polar and non-polar fluids. Omniphilic coatings are generally considered to have a contact angle for both polar and non-polar fluids of less than or equal to about 90°, while omniphobic are generally considered to have a receding contact angle for both polar and non-polar fluids of greater than or equal to about 90°. Thus, at least one surface region of a fluid delivery feature may comprise a coating that is either an omniphilic coating or an omniphobic coating. In certain other variations, the coating may be hydrophobic or superhydrophobic, hydrophilic or superhydrophilic, oleophobic or superoleophobic, or oleophilic or superoleophilic depending on the properties desired.

One type of suitable coating that can be used to modify wetting can comprise surfactants. Surfactants or surface active agents can have both an omniphilic portion of the molecule and an omniphobic portion located in another region of the molecule. One end of the surfactant can be attached to the metal surface of the lattice or porous material and the other exposed to permit interacting or reacting with fluid. The coating may be applied via contacting a gas or liquid phase chemical with or without heat. Specific examples of omniphilic coating materials and surface treatments include etching the interior surfaces with acids, such as chromic or nitric acid. Etching cleans the internal pores and increases surface area, thus improving wetting. Acidic treatments can also produce oxide passivation layers as is done with common stainless steel treatments. Other processes such as heat treatment in certain atmospheres can induce oxides, nitrides, and the like to form causing modified wetting of the surfaces. These processes or coatings lower the surface tension and create more wetting of a fluid. More wetting allows faster capillary action increasing the ease and extent of fluid flow. Conversely certain coatings can create an omniphobic surface. For example, silane compounds (with varying degrees of perfluorinated terminations) can create very low wetting surfaces that can reduce the ease and speed of liquid flow through the porous lattice. Polymeric coatings, such as PTFE, polyolefins that include polypropylene and polyethylene are also generally omniphobic. Many commercially available compositions also can create the two extreme wetting conditions (e.g., omniphilic or omniphobic) described above. These include nano-sized particulates incorporated into the coatings that push the boundaries of wettability.

In other variations, a material may be disposed on a surface of the lattice structure and may be transferred into the passing fluid. Thus, a coating on a surface of a fluid deliver feature may comprise an additive to be transferred to the fluid as it passes through the at least one fluid delivery feature. In one aspect, the additive may be a wear-enhancing additive or a wear-reducing additive. The wear reducing can be introduced into the lattice structure (e.g., post-printing) that can be used to release the wear enhancing additive into the circulating lubricant oil. This additive may serve to reduce friction, prevent scuffing/galling or even increase wear, but may do so on a temporary basis. Reduction in friction and anti-scuffing properties can be enhanced by: phosphorus based additives, sulfur based additives, additives containing PTFE, molybdenum disulfide or graphite or any combination of the above. These particles may be traditional macroscale particles or nanoscale particles. These wear reducing additives can also be "time-released" from the lattice structure. Here, the lattice structure would contain solid masses of the additives that slowly dissolve in the oil or refrigerant over time and slowly diffuse out of the lattice to reduce friction.

Also, to enhance break-in during initial compressor operations, a small amount of nano-abrasive may be added into the lattice structure to increase wear or to be a wear-enhancing additive, but only on a temporary or short-term basis and with only a finite minor amount of additive. During initial operation of the compressor, these particles would exit the lattice and enter the passing fluid, which would be carried to other regions within the compressor to produce quicker break-in wear. Such accelerated break-in improves refrigerant gas sealing and the compressor achieves faster compressor performance. The finite amount of abrasive particles should theoretically become depleted at nearly the same time as acceptable compressor performance/break-in occurs.

For example, a solid material that serves as a desiccant and/or acid catcher can be incorporated into the lattice, for example, as a coating on one or more internal surfaces of the lattice structure. As the oil or refrigerant passes through the high surface area of the latticework, the fluid can be dried (water removed) and/or reduced in acidity. Acids and moisture in HVAC systems can be deleterious. Some oils and refrigerants can produce acids as they age and degrade, so traditionally, filter/driers are used. By incorporating a solid material into the lattice structure through which fluids will pass, discrete filter driers and/or acid catchers can be supplemented or replaced altogether in the compressor.

In certain other variations, the present disclosure contemplates heat-activated or on demand oil delivery. For example, a lubricant oil may be disposed within the pores or internal voids of latticework. The lubricant oil may have a viscosity or volume such that at certain temperature ranges, it resides within the pores or internal voids. However, as frictional heat develops, the oil expands and/or lowers its viscosity because of the heat and spontaneously weeps out onto the metal surfaces to help lubricate friction areas. Thus, in certain aspects, a fluid delivery feature is configured to retain a lubricant oil until frictional heat generated during operation of the compressor facilitates flow and release of the retained lubricant oil from the at least one fluid delivery feature to a friction surface.

The light-weight high-strength compressor components having one or more fluid delivery features according to certain aspects of the present disclosure can be incorporated into a compressor having a variable volume ratio design, a capacity modulation design, a vapor injection design, or a liquid injection design, by way of non-limiting example. The compressor part having the lattice structure and fluid delivery feature according to the present teachings may be any of a variety of parts in the compressor. By way of non-limiting example, the compressor may be multiple different kinds of compressors, including scroll, rotary vane element, centrifugal, single screw, twin screw, reciprocating, linear, and the like. In certain preferred aspects, the compressor components having lattice structures in accordance with the present disclosure are particularly suitable for use in conjunction with a scroll compressor.

Figure 6:
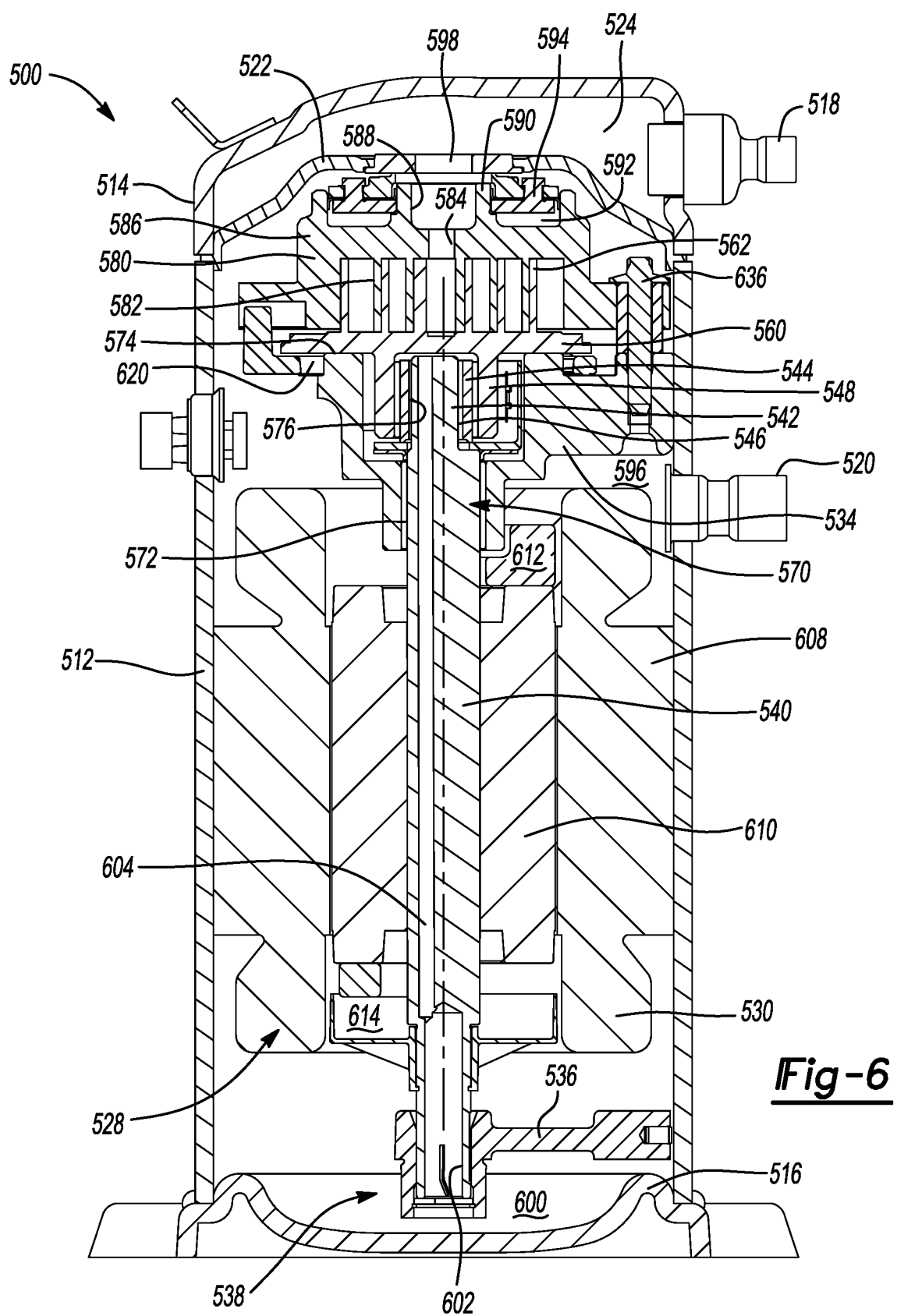
FIG. 6 is a sectional view through a center of a scroll compressor having a conventional design, show an exemplary conventional refrigerant scroll compressor 500

As further reference, the drawings and in particular FIG. 6, show an exemplary conventional refrigerant scroll compressor 500 that includes a generally cylindrical hermetic shell 512 having a cap 514 welded at the upper end thereof and a lower cover 516 welded to a lower end thereof. Cap 514 is provided with a refrigerant discharge 518, which may have the usual discharge valve therein. Other major elements affixed to the shell 512 include a compressor inlet 520; a transversely extending partition 522 which is welded about its periphery at the same point that cap 514 is welded to shell 512. A discharge chamber 524 is defined by cap 514 and partition 522.

A motor 528 including a motor stator 530 is disposed between the main bearing housing 534 and lower bearing support 536. A drive or crankshaft 540 has an eccentric crank pin 542 at the upper end thereof and is rotatably journaled in an upper bearing 544. The upper bearing 544 can include a conventional drive bushing 546 adjacent to (e.g., press-fitted therein). Thus, a cylindrical hub 548 of an orbiting scroll 560 receives the eccentric crank pin 542 and the upper bearing 544. The crankshaft 540 is also supported by and rotatably journaled in a lower bearing assembly 538 attached to the lower bearing support 536. In a central region of the scroll compressor 500, the crankshaft 540 passes through and rotates within an aperture 570 of main bearing housing 534, which may include a cylindrical main bearing member 572 disposed within aperture 570.

A main bearing housing 534 and lower bearing support 536 each define radially outwardly extending legs, which are each secured to the shell 512. The upper surface of the main bearing housing 534 is provided with a flat thrust bearing surface 574 on which is disposed the orbiting scroll 560 having a spiral wrap or vane 562 extending therefrom. Projecting downwardly from the lower surface of orbiting scroll 560 is the cylindrical hub 548. The upper bearing 544 is a self-lubricating sleeve type bearing that receives the drive bushing 546 therein. The cylindrical hub 548, upper bearing 544 and drive bushing 546 each define and create a concentric inner bore 576, in which crank pin 542 of crankshaft 540 is drivingly disposed. Notably, a portion of the bore 576 defines a drive flat surface (not shown) that can receive the crank pin 542, which itself has a flat surface that drivingly engages the drive flat surface formed in a portion of bore 576 to provide a radially compliant driving arrangement, such as shown in assignee's U.S. Pat. No. 4,877,382, the disclosure of which is hereby incorporated herein by reference.

Non-orbiting scroll 580 is provided having a spiral wrap or vane 582 positioned in meshing engagement with the orbiting spiral vane 562 of orbiting scroll 560. Non-orbiting scroll 580 has a centrally disposed discharge passage 584 defined by a base plate portion 586 communicating with an upward opening 588 which is in fluid communication with the muffler discharge chamber 524 defined by cap 514 and partition 522. Non-orbiting scroll 580 also includes an annular hub or raised shoulder portion 590 which surrounds the discharge passage 584. An annular recess 592 is also formed in non-orbiting scroll 580 within which is disposed a floating seal assembly 594.

An intake compartment 596 is in fluid communication with compressor inlet 520 through which the fluids (e.g., refrigerant) to be compressed within the intermeshed spiral vanes 562, 582 (for compression) are introduced. After the fluid passes through intake compartment 596, it is compressed in the spiral vanes 562, 582 so that the pressurized fluid is then released through the discharge passage 584. A reed valve assembly or other known valve assembly (not shown) may be provided in the discharge passage 584 to regulate flow from the discharge passage 584 through an opening 598 in muffler partition 522 and into discharge chamber 524.

The floating seal assembly 594 is supported by the annular recess 592 of non-orbiting scroll 580 and engages a seat of the partition 522 for sealingly dividing intake compartment 596 from discharge chamber 524. Recess 592 and floating seal assembly 594 cooperate to define an axial pressure biasing chamber which receives pressurized fluid being compressed by spiral vanes 562, 582 so as to exert an axial biasing force on non-orbiting scroll 580 to thereby urge the tips of respective spiral vanes 562, 582 into sealing engagement with the opposed baseplate surfaces.

The lower portion of the interior of shell 512 defines an oil sump 600 which is filled with lubricating oil. First bore 602 acts as a pump to force lubricating fluid up the crankshaft 540 and into second bore 604 and ultimately to all of the various portions of the compressor which require lubrication. Crankshaft 540 is rotatably driven by electric motor 528 including motor stator 530, windings 608 passing therethrough, and a motor rotor 610 press fitted on crankshaft 540 and having upper and lower counterweights 612 and 614, respectively.

An Oldham coupling 620 is disposed between orbiting scroll 560 and main bearing housing 534. The Oldham coupling 620 is keyed to orbiting scroll 560 and non-orbiting scroll 580 and thus prevents rotational movement of orbiting scroll 560. Oldham coupling 620 can be of the type of design disclosed in U.S. Pat. No. 5,320,506, the disclosure of which is hereby incorporated herein by reference As illustrated in FIG. 7, a conventional lower bearing housing assembly 538 includes a cylindrical opening 630 extending therethrough that allows crankshaft 540 (FIG. 6) to be seated or mounted within a lower bearing support 632. A cylindrical lower bearing surface 634 is formed in lower bearing support 632 and is disposed directly against the crankshaft 540. In certain alternative variations, a separate self-lubricating cylindrical sleeve bearing may be seated or mounted in the lower bearing support 632. The lower bearing support 536 is attached to the lower bearing assembly 538 and includes a support arm 640 and a connecting portion 642 that can be attached to the shell 512 (as shown in FIG. 6). Crankshaft 540 has at the lower end the relatively large diameter concentric bore 602 which communicates with the radially outwardly smaller diameter bore 604 extending upwardly therefrom from the top of crankshaft 540.

In accordance with certain aspects of the present disclosure, a compressor component having a fluid delivery feature may be a lower bearing component 650, such as that shown in FIG. 8. The lower bearing component 650 may have a body portion 652 with one or more interior regions 658 that have an internal lattice structure 660, such as those described above. The lattice structure 660 is formed internally and thus covered by a metal surface 662. The interior regions 658 also include a porous material 663. Such a component may be formed by any of the additive manufacturing techniques described above. As shown, the lower bearing component 650 includes a cylindrical region 666 that has a cylindrical opening 667 extending there through that allows the crankshaft to be seated or mounted within the cylindrical region 666. The lower bearing support 664 defines a support arm 668 and a connecting portion 669. As shown, the internal lattice structure 660 is formed in the internal body portion of the cylindrical region 666 and internal region of the lower bearing support 664. The porous material 663 is disposed along a portion of the cylindrical region 666 and thus defines a fluid delivery feature that provides fluid communication through the interior of the lower bearing component 650 along the wear surface of the cylindrical opening 668, where the rotating crankshaft is received. Thus, oil may be transferred through the length of the cylindrical region 666 through the lower bearing component 650 to enhance oil flow and thus lubrication. It should be noted that other areas of the interior regions of the lower bearing component 650 may also comprise a porous material (for example, surrounding the entire cylindrical opening surface 668 of cylindrical region 666). Such principles are applicable to any of the compressor components discussed herein.

During the additive manufacturing process, residual powder may remain after energy is applied (e.g., laser that sinters or fuses the solid particles) to form the contiguous solid structures that create the part (including the lattice structure(s)). In certain variations, the residual powders, such as metal powders, may remain inside the lattice structure voids to provide additional insulating properties. Alternatively, the residual powders may be removed via one or more removal holes 670. These removal holes 670 can be located anywhere on the component 650. Notably, in variations where the excess residual powder is not removed, such removal holes 670 may be omitted. Removal of any remaining powder in the porous material 663 is preferred; although separate removal holes open to the exterior of the bearing component 650 are not necessary.

In certain variations, a further manufacturing step may close the removal holes, for example, where the voids defined in the lattice structures are to have a negative pressure or vacuum, or the materials forming the internal core regions are not compatible with materials in the compressor environment (e.g., not compatible with refrigerants and lubricant oils circulating within the compressor or in the porous material). The hole may or may not need to be sealed in the final part, but if so, methods such as soldering, welding, adhesives, and the like may be used. In certain aspects, the lower bearing compressor component may have one or more void regions of the lattice structure filled with an insulating material (or a negative pressure or vacuum) that may minimize transmission of at least one of thermal energy, sounds, or vibration. By using a lower bearing housing having such lattice structures and porous regions as described in FIG. 8, in certain aspects, the component is a high-strength, low weight part that serves to increase lubrication and thus efficiency and lifetime of the compressor in which it is incorporated.

In another variation in accordance with certain aspects of the present disclosure, a light-weight high-strength compressor component having one or more fluid delivery features may be a main bearing housing 700 like that in FIG. 9A. The main bearing housing component 700 defines a body portion 710 of the structure. The body portion 710 may include an upper cylindrical support region 720 and a lower cylindrical support region 722 that together define an opening 724. While not shown in FIG. 9A, the opening 724 may receive the cylindrical hub 548 of orbiting scroll 560 and the eccentric crank pin 542 of crankshaft 540 journaled in upper bearing 544 as shown in compressor 500 of FIG. 6). The main bearing component 700 also includes an outwardly extending leg 726 that includes a bore 728 that receives a fastener (not shown in FIG. 9A, but 636 in FIG. 6) on a terminal end 730 of the body portion 710. Terminal end 730 attaches the main bearing housing component 700 to the shell or housing. The main bearing housing component 700 also defines an upper thrust surface 732.

The body portion 710 of main bearing housing component 700 has one or more interior regions 740 that have an internal lattice structure 742, such as those described above. Various non-limiting embodiments of such lattice structures can include nodes 738 having a spherical or round shape, including hollow spherical nodes, but any of the previous node shapes are also contemplated. Further, the lattice structure 742 may have alternating node types (e.g., patterns of distinct nodes, such as solid sphere, hollow sphere, solid sphere in a single row or alternating rows of hollow and solid spheres). The lattice structure 742 is formed internally within the body portion 710 and thus covered by a metal surface 744. The interior regions 740 also include two fluid delivery passages 746. The fluid delivery passages 746 are formed within the lattice structure 742 delineated therefrom by an internal solid surface 748. Openings 754 to the fluid delivery passages 746 correspond to the inner surface of the upper cylindrical support region 720 and at the upper thrust surface 732. Thus, lubricant oil may flow within the interior regions 740 of the main bearing housing component 700 through the fluid delivery passages 746 to upper thrust surfaces 732. Such fluid delivery passages 746 help to ensure oil flow and lubrication in regions where it can otherwise be difficult for lubricant oil to circulate, especially during high load conditions.

Such a component may be formed by any of the additive manufacturing techniques described above. The fluid delivery passages 746 can be created (e.g., via printing) to facilitate oil passage to surfaces that require additional lubrication. The lattice structure 742 may have materials (e.g., loose particles) disposed within void regions or removed via removal holes 752 in the main bearing housing component 700. The core regions of the body portion 710 having the internal lattice structure 742 formed from an additive manufacturing process may be light-weight and high-strength. In an embodiment like that shown in FIG. 9A, the internal lattice structures 742 provide insulating characteristics to the main bearing housing component 700 that may be further capable of minimizing transmission of sound and vibration through the main bearing housing 700. Further, the main bearing housing 700 prepared in accordance with the present disclosure has reduced mass as compared to a solid main bearing housing. Local lattice cell density modifications can be made in certain embodiments to increase or decrease the housing stiffness and improve sound and/or vibration characteristics. This allows the main bearing housing to be stiff in areas for staking (e.g., to a housing or other stationary component) and flexible in the bearing areas to improve alignment robustness and bearing performance. Such principles are applicable to any of the compressor components discussed in the present disclosure. As appreciated by those of skill in the art, the lattice structure patterns and designs shown in the body portions of various figures can be applied to any other lattice structure designs described or contemplated by this application and to any compressor components.

FIG. 9B shows another variation of a light-weight high-strength main bearing housing 700B compressor component having two distinct fluid delivery features. Unless otherwise discussed herein, the main bearing housing 700B shares a similar design and components like that shown and described above in FIG. 9A, which will not be independently discussed herein for brevity. The interior regions 740B include two fluid delivery passages 746B. The fluid delivery passages 746B are formed within the lattice structure 742 delineated therefrom by an internal solid surface 748. Such a component may be formed by any of the additive manufacturing techniques described above.

Openings 754B to the fluid delivery passages 746B correspond to the inner surface of the upper cylindrical support region 720 and at the upper thrust surface 732B. Thus, lubricant oil may flow within the interior regions 740B of the main bearing housing component 700 through the fluid delivery passages 746B to upper thrust surfaces 732B. The fluid delivery passage 746B terminates near the upper thrust surface 732B in porous regions 750. Each fluid delivery passage 746B thus feeds to a more porous area in the porous region 750 allowing oil to penetrate the upper thrust surface 732B during operation. The fluid delivery features thus also include the porous regions 750. The porous material forming the porous region 750 may be formed as part of the additive manufacturing process or introduced or infused into the part after the additive manufacturing process. Again, such fluid delivery features, such as fluid delivery passages 746B and porous regions 750, help to ensure oil flow and lubrication in regions where it can otherwise be difficult for lubricant oil to circulate, especially during high load conditions.

In yet another variation, FIG. 9C shows a light-weight high-strength main bearing housing component 700C for a compressor having distinct fluid delivery features. Unless otherwise discussed herein, the main bearing housing 700C shares a similar design and components like those shown and described above in FIGS. 9A and 9B, which will not be independently discussed herein for brevity. The interior regions 740C include two fluid delivery passages 746C. The fluid delivery passages 746C are formed within the lattice structure 742 delineated therefrom by an internal solid surface 748C. However, fluid delivery passages 746C have multiple openings 754C corresponding to the inner surface of both the upper cylindrical support region 720 and inner surface of the lower cylindrical support region 722, as well as at upper thrust surfaces 732C. The fluid delivery passages 746C may be filled with a porous material 756. Such a component may be formed by any of the additive manufacturing techniques described above.

Thus, lubricant oil may flow within the interior regions 740C of the main bearing housing component 700 through the fluid delivery passages 746C to upper thrust surfaces 732C. The fluid delivery passage 746C terminates near the upper thrust surface 732C in upper porous regions 750C. Each fluid delivery passage 746C thus facilitates oil transfer to the upper porous regions 750C; allowing additional oil to penetrate the upper thrust surface 732C during operation. The fluid delivery features include the porous upper regions 750C as well as the fluid delivery passages 746C filled with porous material 756. The porous material 756 in the fluid delivery passages 746C helps to regulate the flow rate of oil as it is drawn into the upper porous regions 750C. The porous material forming the porous region 750C may be formed as part of the additive manufacturing process or introduced or infused into the part after the additive manufacturing process. Like in the other embodiments, such fluid delivery passages 746C help to ensure oil flow and lubrication in regions where it can otherwise be difficult for lubricant oil to circulate, especially during high load conditions.

In other embodiments in accordance with certain aspects of the present disclosure, a high-strength, light-weight compressor component may be an orbiting scroll component 800, as shown in FIGS. 10A-10B. The orbiting scroll 800 includes a baseplate 802 having a first side 804 and a second side 806. Vanes 808 define an involute scroll form that extends from the first side 804 of baseplate 802. A cylindrical hub 810 extends downwardly from the second side 806 of baseplate 802. A pair of outwardly projecting flange portions 812 each of which is provided with an outwardly opening slot (not shown, but which receive a pair of Oldham keys from the Oldham coupling). A body portion of the orbiting scroll component 800 may have at least one core or interior region 814 comprising a lattice structure 816 formed via additive manufacturing. A solid surface 818 is disposed over the lattice structure 816. The lattice structure 816 may be disposed in an interior region 814 of one or more of the baseplate 802, the cylindrical hub 810, and/or the vanes 808 of the involute scroll form. Fluid delivery features include a suction port 820A within the baseplate 802 to feed inlet working fluid (refrigerant and oil) into the vanes 808. A discharge port 820B fluid delivery feature is also shown in the center of the baseplate 802 through which compressed working fluid may be discharged. Thus, fluid flow within the orbiting scroll component 800 is provided by the integrally formed fluid delivery features (suction port 820A and discharge port 820B) in the form of a port.

As shown in FIG. 10B, the lattice structure 816 is formed as a continuous region within the baseplate 802. However, as with any of the other components described herein, discrete compartments or internal regions that are sealed or separated from one another may be formed with different lattice structures or different materials, depending upon mechanical properties required. By way of example, only one of the baseplate 802, cylindrical hub 810, or vanes 808 may include the lattice structure 816 (or some combination thereof), in alternative variations. Notably, there are no removal holes formed in the solid surface 818 shown for removal of residual or loose powder from the additive manufacturing process, although they may be included. Thus, a plurality of loose particles may be left within the void regions of the lattice structure 818. This may provide thermal, sound or vibration dampening properties to the orbiting scroll component 800. In other variations, the void regions of the lattice structure may be empty if the loose powder metal is removed via removal holes and then may optionally be left empty or filled with a distinct material. Furthermore, additive manufacturing permits formation of thicker walls for additional reinforcement as needed in certain portions of the orbiting scroll component 800, if needed. The thicker and thinner structures can be printed via the additive manufacturing in the areas where required.

FIGS. 10C-10D show another variation of a compressor component having fluid delivery features according to the present teachings. A non-orbiting scroll component 822 is shown. The non-orbiting scroll 822 includes a baseplate 824 having a first side 826 and a second side 828. Vanes 830 define an involute scroll form that extends from the first side 826 of baseplate 824. Non-orbiting scroll 822 may include an annular hub or raised shoulder portion 832 which surrounds the discharge passage 834. A series of outwardly projecting flange portions 836 may receive a pair of Oldham keys from the Oldham coupling (not shown).

A body portion of the orbiting scroll component 822 has at least one core or interior region 838 comprising a lattice structure 840 formed via additive manufacturing. A solid surface 842 is disposed over the lattice structure 840. The lattice structure 840 may be disposed within an interior region 838 of one or more of the baseplate 824, raised shoulder portion 832, and/or the vanes 830 of the involute scroll component 822. Fluid delivery features include a suction port 844A within the baseplate 824 to feed inlet working fluid (refrigerant and oil) into the vanes 830. A discharge port 844B fluid delivery feature defines the discharge passage 834 and is disposed in the center of the baseplate 824 through which compressed working fluid may be discharged. Thus, fluid flow within and through the non-orbiting scroll component 822 is provided by the integrally formed fluid delivery features (suction port 844A and discharge port 844B) in the form of a port.

As shown in FIG. 10D, the lattice structure 840 is formed as a continuous region within each of the baseplate 824, annular raised shoulder portion 832, and/or the vanes 830 of the involute scroll form. However, as with any of the other components described herein, discrete compartments or internal regions that are sealed or separated from one another may be formed with different lattice structures or different materials, depending upon mechanical properties required. By way of example, only one of the baseplate 824, raised shoulder portion 832, and/or the vanes 830 may include the lattice structure 840 (or some combination thereof), in alternative variations. Notably, there are no removal holes formed in the solid surface 842 shown for removal of residual or loose powder from the additive manufacturing process, although they may be included. Thus, a plurality of loose particles may be left within the void regions of the lattice structure 840. This may provide thermal, sound or vibration dampening properties to the non-orbiting scroll component 822. In other variations, the void regions of the lattice structure may be empty if the loose powder metal is removed via removal holes and then may optionally be left empty or filled with a distinct material. Furthermore, additive manufacturing permits formation of thicker walls for additional reinforcement as needed in certain portions of the non-orbiting scroll component 822, if needed. The thicker and thinner structures can be printed via the additive manufacturing in the areas where required.

In other embodiments in accordance with certain aspects of the present disclosure, a high-strength, light-weight compressor component having one or more fluid delivery features may be an orbiting scroll component 850 as in FIG. 11A. The orbiting scroll 850 includes a baseplate 860 having a first side 862 and a second side 864. Vanes 866 define an involute scroll form that extends from the first side 862 of baseplate 860. A cylindrical hub 868 extends downwardly from the second side 864 of baseplate 860. A pair of outwardly projecting flange portions 870 each of which is provided with an outwardly opening slot (not shown, but which receive a pair of Oldham keys from the Oldham coupling). A body portion 872 of the orbiting scroll component 850 has at least one core or interior region 874 comprising a lattice structure 880 formed via additive manufacturing. A solid surface 882 is disposed over the lattice structure 880. The lattice structure 880 may be disposed in an interior region 872 of one or more of the baseplate 860, the cylindrical hub 868, and/or the vanes 866 of the involute scroll form.

A fluid delivery passage 886 is formed within the lattice structure 880 delineated therefrom by an internal solid surface 887. Openings 888 to the fluid delivery passage 886 correspond to a thrust surface on the first side 862 of baseplate 860 and a surface on the second side 864 of baseplate 860 within the cylindrical hub 868. The thrust surface on the first side 862 of baseplate 860 corresponds to a region of the compression mechanism where vanes from the opposing non-orbiting scroll contact during operation. Thus, lubricant oil may flow within the interior regions 874 of the orbiting scroll component 850 through the fluid delivery passage 886 between the first side 862 and the second side 864 of the baseplate 860. While only a single oil delivery passage 886 is shown in FIG. 11A, multiple fluid delivery passages are likewise envisioned. Such fluid delivery passages 886 help to ensure oil flow and lubrication in regions where it can otherwise be difficult for lubricant oil to circulate, especially during high load conditions. It is also envisioned that the fluid passages can provide an oil supply to the thrust surface on the first side 862 of baseplate 860, where it can be injected into or picked up by the suction gas entering the compression pockets generated by the intermeshed spiral vanes 562 and 582 of the orbiting scroll 560 and the non-orbiting scroll 580 as shown in FIG. 6. This mixture of gas and oil can help improve compressor efficiency and or improve compressor reliability.

Such a component may be formed by any of the additive manufacturing techniques described above. The fluid delivery passages 886 can be created (e.g., via printing) to facilitate oil passage to surfaces that require additional lubrication. The lattice structure 880 can likewise be formed via the additive manufacturing process. As shown in FIG. 11A, the lattice structure is formed as a continuous region within each of the baseplate 860, the cylindrical hub 868, and/or the vanes 866 of the involute scroll form. However, as with any of the other components described herein, discrete compartments or internal regions that are sealed or separated from one another may be formed with different lattice structures or different materials, depending upon mechanical properties required. By way of example, only one of the baseplate 860, cylindrical hub 868, or vanes 866 may include the lattice structure 880 (or some combination thereof), in alternative variations. Notably, there are no removal holes formed in the solid surface 882 for removal of residual or loose powder from the additive manufacturing process. Thus, a plurality of loose particles 884 may be left within the void regions of the lattice structure 880. This may provide thermal, sound, or vibration dampening properties to the orbiting scroll component 850. Furthermore, certain areas may require thicker walls (or solid surfaces 882), for example, solid surface 882 may be thicker on the second side 864 along the cylindrical hub 868 and lower regions of the baseplate 860, while solid surface 882 may be thinner along the first side 862, including along the surface regions of vanes 866. The scroll vanes 866 are designed for weight reduction with equal or better strength than conventionally formed vanes. The thicker and thinner structures can be printed via the additive manufacturing in the areas where required.

Another variation of a high-strength light-weight orbiting scroll component 850B having one or more fluid delivery features is shown in FIG. 11B. The design and components in orbiting scroll component 850B are the same as those in orbiting scroll component 850 in FIG. 11A, unless otherwise discussed herein. In orbiting scroll component 850B, including baseplate 860B, a solid surface 882B is disposed over a lattice structure 880B. However, one or more removal holes 890 are formed in the solid surface 882B for removal of residual or loose powder remaining after the additive manufacturing process. Thus, the lattice structure 880B may have empty void regions. Notably, some loose particles may remain in the voids after the removal process; however a majority of loose and residual particles are removed. In certain aspects, the lattice structure 880B design may provide adequate insulation to heat, sound or vibration where desired, so that leaving such particles or introducing another material is not necessary. In other variations, the lattice structure 880B may have empty void regions that are subsequently filled with distinct materials (e.g., solids, gels, foams, liquids, or gases) or negative pressure/vacuum. After removal, the removal holes 890 in the solid surface 882B may be subsequently sealed over with a material via a variety of known techniques to create such patches. The removal holes 890 may be sealed when it is desirable to have a contained or sealed interior volume, for example, when the interior region 872 is formed of or contains a material that is not compatible with refrigerant and oils in the compressor or a vacuum is present in the voids of the lattice structure 880B. The holes 890 may or may not need to be sealed in the final part, but if so, methods such as soldering, welding, adhesives, and the like may be used.

Another variation of a high-strength light-weight orbiting scroll component 850C having one or more fluid delivery features is shown in FIGS. 11C-11D. The design and components in orbiting scroll component 850C are the same as those in orbiting scroll component 850B in FIG. 11B, unless otherwise discussed herein. Fluid delivery passages 886C are formed in the baseplate 860C within the lattice structure 880C that has a solid surface 882C disposed thereon. The fluid delivery passages 886C are delineated from the lattice structure 880C by an internal solid surface 887C. Openings 888C to the fluid delivery passage 886C correspond to a terminal end 889 of baseplate 860C and a surface on the second side 864 of baseplate 860C within the cylindrical hub 868. The terminal ends 889 of the baseplate 860C have Oldham key slots 892 that interact with the Oldham keys of the Oldham ring (not shown in FIGS. 11C and 11D) during compressor operation. Thus, lubricant oil may flow within the interior regions 874C of the orbiting scroll component 850C through the fluid delivery passages 886C between the second side 864 of the baseplate 860 to the terminal end 889 and Oldham key slots 892 to feed lubricant oil to the Oldham keys. Again, such fluid delivery passages 886C help to ensure oil flow and lubrication in regions where it can otherwise be difficult for lubricant oil to circulate, especially during high load conditions. It should be noted that such a design may be implemented with a design similar to that shown in FIG. 11A, where the lattice is filled with loose powder materials, as well.

Yet another variation of a high-strength light-weight orbiting scroll component 850E having one or more fluid delivery features is shown in FIG. 11E. The design and components in orbiting scroll component 850E are the same as those in orbiting scroll component 850B in FIG. 11B, unless otherwise discussed herein. Fluid delivery passages 886E are formed in the baseplate 860E within the lattice structure 880E that has a solid surface 882E disposed thereon. The fluid delivery passages 886E are delineated from the lattice structure 880E by an internal solid surface 887E. Openings 888E to the fluid delivery passage 886E correspond to a surface on the second side 864 of baseplate 860E within the cylindrical hub 868 and to a plurality of discrete regions outside the cylindrical hub 868 corresponding to lower thrust regions 896 on the second side 864 of baseplate 860E. During compressor operation, the flat thrust bearing surface 574 of upper surface of the main bearing housing (shown in FIG. 6 as 534) interacts with the lower thrust regions 896 on the baseplate 860E. Thus, lubricant oil may flow within the interior regions 874E of the orbiting scroll component 850E through the fluid delivery passages 886E between the inner portion of the cylindrical hub 868 to the regions on the outside of the cylindrical hub 868 corresponding to the lower thrust regions 896. Such fluid delivery passages 886E help to ensure oil flow and lubrication in regions where it can otherwise be difficult for lubricant oil to circulate, especially during high load conditions. It should be noted that such a design may be implemented with a design similar to that shown in FIG. 11A, where the lattice is filled with loose powder materials, as well. While only a single set of oil delivery passage 886E is shown in FIG. 11E, multiple fluid delivery passages can likewise envisioned.

FIG. 11F shows a variation of a high-strength light-weight orbiting scroll component 850F having two distinct fluid delivery features similar to that shown in FIG. 11E. The design and components in orbiting scroll component 850F are the same as those in orbiting scroll component 850E in FIG. 11E, unless otherwise discussed herein. The interior regions 874F include two distinct fluid delivery passages 886F. The fluid delivery passages 886F are formed within the lattice structure 880F delineated therefrom by an internal solid surface 887F. Such a component may be formed by any of the additive manufacturing techniques described above.

Openings 888F to the fluid delivery passage 886F correspond to a surface on the second side 864 of baseplate 860F within the cylindrical hub 868 and to a plurality of discrete regions outside the cylindrical hub 868 corresponding to lower thrust regions 896 on the second side 864 of baseplate 860F (that interact with thrust surfaces on the main bearing housing). The fluid delivery passage 886F terminates near the lower thrust regions 896 in porous regions 898. Each fluid delivery passage 886F thus feeds to a more porous area in the porous region 898 allowing oil to penetrate the lower thrust surface 896 during operation. The fluid delivery features thus also include the porous regions 898. The porous material forming the porous region 898 may be formed as part of the additive manufacturing process or introduced or infused into the part after the additive manufacturing process. Again, such fluid delivery features, such as fluid delivery passages 886F and porous regions 898, help to ensure oil flow and lubrication in regions where it can otherwise be difficult for lubricant oil to circulate, especially during high load conditions. Again while only a single set of oil delivery passage 886F are shown in FIG. 11F, multiple fluid delivery passages can likewise envisioned. Notably, such porous fluid delivery features may be used at openings with any of the embodiments previously shown having fluid passages or the porous material may fill the entire fluid passage, and can serve to regulate flow of lubricant oils or other fluids. By way of non-limiting example, while not shown in the embodiment FIGS. 11C and 11D, the openings 888C at the terminal ends 889 of fluid passages 886C located at the Oldham key slots 892 can have a porous material introduced in a similar manner.

Fluid delivery passages 886F are formed in the baseplate 860F within the lattice structure 880F that has a solid surface 882F disposed thereon. The fluid delivery passages 886F are delineated from the lattice structure 880F by an internal solid surface 887F. Openings 888F to the fluid delivery passage 886F correspond to a surface on the second side 864 of baseplate 860F within the cylindrical hub 868 and to a plurality of discrete regions outside the cylindrical hub 868 corresponding to lower thrust regions 896 on the second side 864 of baseplate 860F. During compressor operation, the flat thrust bearing surface 574 of upper surface of the main bearing housing (shown in FIG. 6 as 534) interacts with the lower thrust regions 896 on the baseplate 860F. Thus, lubricant oil may flow within the interior regions 874F of the orbiting scroll component 850F through the fluid delivery passages 886F between the inner portion of the cylindrical hub 868 to the regions on the outside of the cylindrical hub 868 corresponding to the lower thrust regions 896. Such fluid delivery passages 886F help to ensure oil flow and lubrication in regions where it can otherwise be difficult for lubricant oil to circulate, especially during high load conditions. It should be noted that such a design may be implemented with a design similar to that shown in FIG. 11A, where the lattice is filled with loose powder materials, as well.

In accordance with certain aspects of the present disclosure, a high-strength light-weight orbiting scroll component 850G having a porous fluid delivery feature is shown in FIG. 11G. The design and components in orbiting scroll component 850G are the same as those in orbiting scroll component 850 in FIG. 11A or 850F shown in FIG. 11F, unless otherwise discussed herein. Notably, orbiting scroll component 850G is shown without an internal lattice structure 880 like in FIG. 11A or internal lattice 880F in FIG. 11F, although one or more internal lattice structures may be formed in certain regions. In the interior regions 874G of orbiting scroll component 850G, fluid delivery passages 886G are created by porous regions 898G comprising a porous material. A solid surface 882G forms the remainder of the orbiting scroll component 850G and is disposed over and around the porous regions. Porous regions 898G are disposed in vanes 899, cylindrical hub 868G, and baseplate 860G. The porous regions 898G may include porous material having different pore sizes in different regions. Thus, the passages 886G can feed a more porous area allowing the oil to penetrate various surfaces during operation.

The vanes 899 include openings 888G at the tips. Similarly, openings 888G to the fluid delivery passage 886G correspond to a thrust surface on the first side 862G of baseplate 860G and a surface on the second side 864G of baseplate 860G within the cylindrical hub 868G. Thus, lubricant oil may flow within the interior regions 874G of the orbiting scroll component 850G through the fluid delivery passage 886G between the vanes 899, to the first side 862G, and to the second side 864G of the baseplate 860G. As with other embodiments, such fluid delivery passages 886G help to ensure oil flow and lubrication in regions where it can otherwise be difficult for lubricant oil to circulate, especially during high load conditions.

The porous material forming the porous region 898G may be formed as part of the additive manufacturing process or introduced or infused into the part after the additive manufacturing process, as described above. Again, such fluid delivery features, such as porous fluid delivery passages 886G, help to ensure oil flow to various regions requiring lubrication during compressor operation. It should be noted that the design of the porous regions 898G is desirably such that no high pressure side to low pressure side leaks occur. In certain variations, the porous regions 898G may be partially or fully filled or infused with another material as a sealant to minimize pressure leaks. Thus, vanes 899 may have a sealing material infused therein after additive manufacturing in certain designs to prevent fluid leaks.

Another variation of a high-strength light-weight compressor component having one or more fluid delivery features is non-orbiting scroll component 900 is shown in FIG. 12A. The non-orbiting scroll 900 includes a baseplate 910 having a first side 912 and a second side 914. Vanes 916 define an involute scroll form that extends from the first side 912 of baseplate 910. Non-orbiting scroll 900 includes an annular hub or raised shoulder portion 918 which surrounds the discharge passage 920. An annular recess 922 is also formed in non-orbiting scroll 900 within which a floating seal assembly may be disposed (not shown). A series of outwardly projecting flange portions 924 each of which is provided with an outwardly opening slot (not shown, but which receive a pair of Oldham keys from the Oldham coupling).

A body portion 930 of the non-orbiting scroll component 900 has at least one core or interior region 932. In the interior regions 932, fluid delivery passages 934 are created by porous regions 936 comprising a porous material 938. The interior region 932 also comprises a lattice structure 940 formed via additive manufacturing. A solid surface 942 is disposed over the lattice structure 940 and around the porous regions 936. An internal solid surface 928 divides the porous regions 936 defining fluid delivery passages 934 from the lattice structure 940.

Porous regions 936 are disposed in vanes 916 and along the thrust surface along the first side 912 of baseplate 910. Thus, lubricant oil may flow within the interior regions 932 of the non-orbiting scroll component 900 through the fluid delivery passage 934 comprising the porous regions 936 between the vanes 916 to the first side 912 of the baseplate 910. The porous regions 936 may include porous material having different pore sizes in different regions to facilitate different rates of oil or fluid flow therein. Thus, the fluid delivery passages 934 can feed a more porous area, allowing the oil to penetrate various surfaces during operation, as needed. The vanes 916 include openings 948 at the tips. Similarly, openings 948 to the fluid delivery passage 934 correspond to the thrust surface on the first side 912 of baseplate 910. As with other embodiments, such fluid delivery passages 934 help to ensure oil flow and lubrication in regions where it can otherwise be difficult for lubricant oil to circulate, especially during high load conditions.

The lattice structure 940 may be disposed within an interior region 932 of one or more of the baseplate 910, raised shoulder portion 918, and/or the vanes 916 of the involute scroll form. As shown in FIG. 12A, the lattice structure 940 is formed as a continuous region within portions of the baseplate 910 and annular raised shoulder portion 918. However, as with any of the other components described herein, discrete compartments or internal regions that are sealed or separated from one another may be formed with different lattice structures or different materials, depending upon mechanical properties required. By way of example, only one of the baseplate 910 or annular raised shoulder portion 918 may include the lattice structure 940 (or some combination thereof), in alternative variations. Notably, there are no removal holes formed in the solid surface 942 for removal of residual or loose powder from the internal lattice structure 940 formed via additive manufacturing process. Thus, a plurality of loose particles 944 may be left within the void regions of the lattice structure 940.

This may provide additional thermal, sound or vibration dampening properties to the non-orbiting scroll component 900. Notably, certain areas may require thicker walls (or thicker solid surfaces 942), for example, solid surface 942 may be thicker on the second side 914 to reinforce the structure, while solid surface 942 may be thinner along the first side 912, including along the surface regions of vanes 916. The scroll vanes 916 are designed for weight reduction with equal or better strength than conventionally formed vanes. The thicker and thinner structures can be printed via the additive manufacturing in the areas where required.

Another variation of a high-strength light-weight compressor component having fluid delivery features is non-orbiting scroll component 900B is shown in FIG. 12B. The design and components in non-orbiting scroll component 900B are the same as those in non-orbiting scroll component 900 in FIG. 12A, unless otherwise discussed herein. In non-orbiting scroll component 900B, a solid surface 942B is disposed over a lattice structure 940B. However, one or more removal holes 946 are formed in the solid surface 942B for removal of residual or loose powder remaining after the additive manufacturing process. Thus, the lattice structure 940B may have empty void regions. Notably, some loose particles may remain in the voids after the removal process; however a majority of loose and residual particles are removed. In certain aspects, the lattice structure 940B design may provide adequate insulation to thermal, sound or vibration so that leaving such particles or introducing another material is not necessary. In other variations, the lattice structure 940B may have empty void regions that are subsequently filled with distinct materials (e.g., solids, gels, foams, liquids, or gases) or negative pressure/vacuum. After removal, the removal holes 946 in the solid surface 942B may be subsequently sealed over with a material via a variety of known techniques to create such patches. The removal holes 946 may be sealed when it is desirable to have a contained or sealed interior volume, for example, when the interior region 932 is formed of or contains a material that is not compatible with refrigerant and oils in the compressor or a vacuum is present in the voids of the lattice structure 940B. The holes 946 may or may not need to be sealed in the final part, but if so, methods such as soldering, welding, adhesives, and the like may be used.

Another variation of a high-strength light-weight compressor component having fluid delivery features is non-orbiting scroll component 900C is shown in FIG. 12C. The design and components in non-orbiting scroll component 900C are the same as those in non-orbiting scroll component 900B in FIG. 12B, unless otherwise discussed herein. Notably, the design of the non-orbiting scroll component 900C does not have any porous regions as fluid delivery features. However, non-orbiting scroll component 900C has a lattice structure 940C disposed within interior regions 932C. The lattice structure 940C is disposed within the vanes 916C and baseplate 910C of the interior region 932C. A solid surface 942C is disposed over the lattice structure 940C. In certain variations, loose powder may remain in the lattice structure 940C voids, if desired.

In other variations, one or more removal holes 946C are formed in the solid surface 942A for removal of residual or loose powder remaining after the additive manufacturing process. Thus, the lattice structure 940C may have empty void regions. Notably, some loose particles may remain in the voids after the removal process; however a majority of loose and residual particles are removed. In certain aspects, the lattice structure 940C design may provide adequate insulation to thermal, sound or vibration so that leaving such particles or introducing another material is not necessary. In other variations, the lattice structure 940C may have empty void regions that are subsequently filled with distinct materials (e.g., solids, gels, foams, liquids, or gases) or negative pressure/vacuum. After removal and possible introduction of new materials, the removal holes 946C in the solid surface 942C may be subsequently sealed over with a material via a variety of known techniques to create such patches. The removal holes 946C may be sealed when it is desirable to have a contained or sealed interior volume, for example, when the interior region 932C is formed of or contains a material that is not compatible with refrigerant and oils in the compressor or a vacuum is present in the voids of the lattice structure 940C.

Non-orbiting scroll component 900C also contains at least one fluid delivery feature 950 in the form of a fluid port 952 connected to at least one channel or passage 954 that enables fluid communication within the non-orbiting scroll component 900C. As shown in FIG. 12C, the channel or passage 954 includes a horizontal flow passage 956 in fluid communication with the fluid port 952 and a vertical flow passage 958. The vertical flow passage 958 is in fluid communication and opens to a surface on the first side 912 of the baseplate 910C between the vanes 916C that corresponds to a portion of the compression mechanism. Thus, fluid delivery features, including ports 952 and passages 954 and 958 can be formed via additive manufacturing in areas where needed, such as a vapor/liquid injection or a modulation passages. Another fluid delivery feature 950 is an intermediate chamber bleed hole 952 that can be similarly formed. Any fluid delivery features, including ports and/or passages can be formed (e.g., via printing) within the body regions of the non-orbiting scroll compressor components in areas where needed for vapor injections or liquid injections or for variable volume ratio (VVR) ports or for ports providing capacity modulation. While only a single fluid delivery passage is shown, it should be understood that multiple fluid delivery passages are likewise envisioned. While not shown, a set of valves may be incorporated to open and close the ports. This could be done after printing or during the printing cycle.

In yet other variation, a non-orbiting scroll component 900D having at least one fluid delivery feature 950D in the form of at least one fluid channel or passage 954D enables fluid communication within the non-orbiting scroll component 900D in FIG. 12D. While the non-orbiting scroll component 900D has a slightly different capacity modulation design than non-orbiting scroll design in FIG. 12C; however, they share many of common features and for brevity, such features can be considered the same unless discussed further here. As shown in FIG. 12D, the channels or passages 954D includes a vertical flow passage 958D. The vertical flow passage 958D enables fluid communication and opens to a surface on the first side 912 of the baseplate 910D between the vanes 916D that corresponds to a portion of the compression mechanism. On the other end, the vertical flow passage 958D opens to a capacity modulation chamber 960. In this manner, the vertical flow passage 958D can serve as a modulation passage.

Non-orbiting scroll component 900D has a lattice structure 940D disposed within interior regions 932D. The lattice structure 940D is disposed within the vanes 916D and baseplate 910D of the interior region 932D. A solid surface 942D is disposed over the lattice structure 940D. In certain variations, residual or loose powder remaining after the additive manufacturing process may remain in the void regions of the lattice structure 940D. In other variations, one or more removal holes 946D are formed in the solid surface 942D for removal of residual or loose powder remaining after the additive manufacturing process or introduction of new materials, as discussed above. Such removal holes 946D may be subsequently sealed or closed.

FIG. 12E shows yet another variations of a non-orbiting scroll component 900E having at least one fluid delivery feature 950E enabling fluid communication within the non-orbiting scroll component 900E. While the non-orbiting scroll component 900E has a slightly different variable volume ratio design than non-orbiting scroll designs in FIGS. 12C-12D, the non-orbiting scroll components share many of common features and for brevity, such features can be considered the same unless discussed further here. As shown in FIG. 12E, a plurality of channels or passages 954E defines vertical flow passages. The vertical flow passages 954E enable fluid communication and open to a surface on the first side 912 of the baseplate 910E between the vanes 916E that corresponds to a portion of the compression mechanism. On the other side, the vertical flow passages 954E open to a secondary volume chamber 962. In this manner, the vertical flow passage 954E can serve as a passage enabling fluid communication when necessary between the primary compression mechanism volume and the secondary volume chamber 962 to create a variable volume ratio compressor design. While not shown, a set of valves may be incorporated to open and close the ports 954E. This could be done after printing or during the printing cycle. As with previous designs, non-orbiting scroll component 900E has a lattice structure 940E disposed within interior regions 932E. The lattice structure 940E is disposed within the vanes 916E and baseplate 910E of the interior region 932E. A solid surface 942E is disposed over the lattice structure 940E. In certain variations, residual or loose powder remaining after the additive manufacturing process may remain in the void regions of the lattice structure 940E. In other variations, while not shown, removal holes may be used to remove residual or loose powder remaining after the additive manufacturing process and optionally introduce new materials into the lattice structure 940E, as discussed above.

Thus, various fluid delivery features, including ports and channels/passages can be formed via additive manufacturing in areas where needed, such as a vapor/liquid injection passage, fluid injection ports, or capacity modulation features, by way of non-limiting example. The compressor component may be incorporated into a compressor having a variable volume ratio design, a capacity modulation design, a vapor injection design, or a liquid injection design, by way of non-limiting example. Again while not shown, a set of valves may be incorporated to open and close the ports. This could be done after printing or during the printing cycle.

In another variation in accordance with certain aspects of the present disclosure, a light-weight high-strength scroll compressor component having a fluid delivery feature may be a crankshaft 1000 shown in FIG. 13A. The crankshaft 1000 has a crankpin 1002 on one end and a terminal end 1004 at an opposite end. The crankshaft 1000 is rotatably driven by a motor (not shown in FIG. 13A). The crankpin 1002 has a flat surface 1006 that drivingly engages with an opposing drive flat surface in a bore within a cylindrical hub of an orbiting scroll member (not shown). The terminal end 1004 can seat within a lower bearing assembly (not shown). A first open channel or bore 1010 is formed within the crankshaft 1000 at the terminal end 1004 and permits lubricating oil to be pumped up the crankshaft 1000 into second bore 1012. Second bore 1012 has two terminal openings 1036, thus ultimately lubricating oil is pumped through crankshaft 1000 to all of the various portions of the compressor which require lubrication. Thus, the first open bore 1010 and second bore 1012 serve as fluid delivery passages through a length of the crankshaft 1000.

A body portion 1020 of the crankshaft 1000 is disposed between the crankpin 1002 and the terminal end 1004. The body portion 1020 has at least one core or interior region 1022 comprising a lattice structure 1030 formed via additive manufacturing, as previously described above. A solid surface 1032 is disposed over the lattice structure 1030. The lattice structure 1030 may be disposed in an interior region 1022 of body portion 1020. The internal second bore 1012 is separated from the lattice 1030 by an internal solid surface 1034. As discussed above, in certain variations, the residual powders, such as metal powders, may remain inside the lattice structure voids to provide additional properties. The excess unsintered powder may be removed or in alternative variations, may remain in the voids of the lattice structure. As shown in FIG. 13A, there are no removal holes in the solid surface 1032 for removing residual or loose powder from the additive manufacturing process. Thus, a plurality of loose particles may be left within the void regions of the lattice structure 1030. This may provide thermal, sound or vibration dampening properties to the crankshaft 1000. Furthermore, additive manufacturing permits formation of thicker walls for additional reinforcement as needed in certain portions of the crankshaft 1000, if needed. The thicker and thinner structures can be printed via the additive manufacturing in the areas where required.

The crankshaft 1000 also includes two distinct porous fluid delivery features. A first porous region 1040 comprising a porous material is disposed on the wear surfaces at the terminal end 1004. A second porous region 1044 also comprising a porous material is disposed on the wear surfaces at a proximal end 1046 of the crankshaft 1000 adjacent to the crankpin 1002. Such porous components may be formed by any of the additive manufacturing techniques described above.

As shown, the internal lattice structure 1030 is formed in the internal body portion 1020 of the crankshaft 1000. The first porous region 1040 is disposed along a portion of the crankshaft 1000 that interfaces with the lower bearing, while the second porous region 1044 is disposed along a portion of the crankshaft 1000 that interfaces with a main bearing. The first porous region 1040 and the second porous region 1044 thus define fluid delivery features that provide lubricant oil to wear surfaces to portions of the rotating crankshaft 1000 during operation. The first bore 1010 and the second bore 1012 likewise provide oil and fluid communication through the interior regions of the crankshaft 1000 along its length. Thus, oil may be transferred through the length of the crankshaft from the terminal end 1004 to the crankpin 1002 at the opposite end, thus providing enhanced lubrication for the compressor during operation. The fluid delivery features can thus be created (e.g., via printing) to facilitate oil passage to surfaces that require additional lubrication. The lattice structure 1030 can likewise be formed via the additive manufacturing process.

Another variation of a high-strength light-weight crankshaft 1000B having one or more fluid delivery features is shown in FIG. 13B. The design and components in crankshaft 1000B are the same as those in crankshaft 1000 in FIG. 13A, except to the extent discussed herein. The solid surface 1032B in crankshaft 1000B is disposed over a lattice structure 1030B. The lattice structure 1030B is disposed within at least one core or interior region 1022B within the body portion 1020B. The lattice structure 1030B is formed via additive manufacturing, as previously described above.

However, one or more removal holes 1048 are formed in the solid surface 1032B for removal of residual or loose powder remaining after the additive manufacturing process. Thus, the lattice structure 1030B may have empty void regions. Notably, some loose particles may remain in the voids after the removal process; however a majority of loose and residual particles are removed. In certain aspects, the lattice structure 1030B design may provide adequate insulation to heat, sound or vibration where desired, so that leaving such particles or introducing another material is not necessary. In other variations, the lattice structure 1030B may have empty void regions that are subsequently filled with distinct materials (e.g., solids, gels, foams, liquids, or gases) or negative pressure/vacuum. After removal, the removal holes 1048 in the solid surface 1032B may be subsequently sealed over with a material via a variety of known techniques to create such patches. The removal holes 1048 may be sealed when it is desirable to have a contained or sealed interior volume, for example, when the interior region 1022B is formed of or contains a material that is not compatible with refrigerant and oils in the compressor or a vacuum is present in the voids of the lattice structure 1030B. The holes 1048 may or may not need to be sealed in the final part, but if so, methods such as soldering, welding, adhesives, and the like may be used. As discussed above, in certain variations, the residual powders, such as metal powders, may remain inside the lattice structure voids to provide additional properties. It should be noted that any of the embodiments discussed above that are shown to have excess unsintered powder disposed in voids of the lattice structure may be modified to instead have the excess or residual powder removed from the voids in the lattice structure. Similarly, any of the embodiments shown above that have loose or excess powder removed may instead have the powder remaining in the voids of the lattice structure.

As discussed above, the various lattice structures discussed above may be used in the body portions of a variety of distinct compressor components. The embodiments discussed previously herein are representative and such concepts may be applied to a variety of distinct compressor components. Compressor components are contemplated that have a body portion with at least one interior region comprising a lattice structure formed via additive manufacturing and a surface disposed over the lattice structure. Further, the fluid delivery features, whether as internal channels or passages, fluid ports, or porous fluid delivery features can be created (e.g., via printing) within the body portion of the component to facilitate fluid flow through the compressor component. Such fluid delivery features can also be formed in the same additive manufacturing process as the internal lattice structure. Each component can be optimized for weight, fluid delivery, strength, sound transfer, or heat transfer or any combination of these. Such components serve to desirably improve fluid flow within the compressor. The components prepared in accordance with certain aspects of the present teachings thus provide light-weight components with strength and robustness to withstand various operating conditions in a compressor, such as a scroll compressor.

In certain aspects, a compressor component may be an assembly formed from a first piece or part that is created via additive manufacturing having at least one interior region comprising a lattice structure and one or more fluid delivery features. The assembly may further comprise other pieces or parts that are created via conventional formation techniques, for example, being wrought, cast, or sintered from a powdered metal in a conventional manner as recognized in the art.

Types of compressors that can incorporate components prepared in accordance with certain aspects of the present disclosure include positive displacement and dynamic compressors. Positive displacement compressors increase refrigerant vapor pressure by reducing the volume of the compression chamber through work applied to the compressor's mechanism. Positive displacement compressors include many styles of compressors currently in use, such as reciprocating, linear, rotary (rolling piston, rotary vane element, single screw, twin screw, centrifugal compressor component), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles.

By way of non-limiting example, in certain variations, the light-weight, high-strength compressor component is optionally selected from the group consisting of: a bearing housing, a main bearing housing, a lower bearing housing, an orbiting scroll component, a non-orbiting scroll component, a housing or a shell, a cap, a cover, a separator plate, a muffler plate, an Oldham coupling, a scroll compressor valve, a drive bushing, an interface region between a shell and stator, a roller element, a rotary vane element, a roller element housing, a screw component, a screw, a gate rotor, a bearing, a centrifugal compressor component, a reciprocating component, a piston, a connecting rod, a crankshaft, a cylinder head, a compressor body, a discus valve, a discus valve retainer, a valve plate, and combinations thereof. Such a component having an internal lattice structure when incorporated into a compressor serves to reduce weight, while improving fluid flow within the compressor. The fluids may include lubricant oil, refrigerants, or combinations therefore. In certain aspects, such a component having one or more fluid delivery features enhances lubrication of the component within the compressor during operation. In other aspects, such a component may be incorporated into a compressor that has a higher efficiency or enhanced performance. Also local lattice density modifications could be made to increase or decrease the housing stiffness and improve thermal, sound and/or vibration characteristics. This could allow the component to be stiff in areas for welding and flexible in the bearing areas to improve alignment robustness and bearing performance.

In certain variations, the compressor may be a scroll compressor and the compressor component may be a scroll compressor component. In certain embodiments, the light-weight, high-strength scroll compressor component is optionally selected from the group consisting of: a bearing housing, a main bearing housing, a lower bearing housing, an orbiting scroll component, a non-orbiting scroll component, a crankshaft, a housing or a shell, a cap, a cover, a separator plate, a muffler plate, an Oldham coupling ring, a scroll compressor valve, a drive bushing, an interface region between a shell and stator, and combinations thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light-weight high-strength compressor component for a compressor having at least one fluid delivery feature comprising:
 a body portion having at least one interior region that comprises a lattice structure comprising a plurality of cells formed via additive manufacturing and a surface disposed over the lattice structure, wherein the body portion comprises at least one fluid delivery feature to facilitate fluid flow through the body portion of the light-weight, high-strength compressor component, wherein the at least one fluid delivery feature comprises a porous material.

2. The light-weight high-strength compressor component of claim 1, wherein the at least one fluid delivery feature is an open channel comprising the porous material to facilitate fluid communication within the compressor component.

3. The light-weight high-strength compressor component of claim 2, wherein at least a portion of the open channel is formed within the lattice structure and is separated from the lattice structure by a solid internal wall.

4. The light-weight high-strength compressor component of claim 2, wherein the open channel permits flow of lubricant oil or refrigerant.

5. The light-weight high-strength compressor component of claim 1, wherein the at least one fluid delivery feature comprises a fluid delivery port connected to at least one channel that provides fluid communication within the compressor component.

6. The light-weight high-strength compressor component of claim 1, wherein the at least one fluid delivery feature comprises a fluid delivery port selected from the group consisting of: bleed holes, vapor injection ports, liquid injection ports, valve placement ports, modulation ports, pressure feed ports, variable volume ratio ports, discharge ports, suction ports, and combinations thereof.

7. The light-weight high-strength compressor component of claim 1, wherein the porous material has a first region with a first average pore size and a second region with a second average pore size, wherein the second average pore size is smaller than the first average pore size.

8. The light-weight high-strength compressor component of claim 1, wherein each cell of the plurality of cells of the lattice structure comprises a node having a shape selected from the group consisting of: a sphere, a modified sphere comprising one or more flat surface regions, a sphere comprising posts, a cone, a double-cone, a pyramid, a diamond, a star, a cube, a polyhedron, an irregular asymmetrical globular shape, and combinations thereof.

9. The light-weight high-strength compressor component of claim 1, wherein the plurality of cells comprises a first cell comprising a first node and a second adjacent cell comprising a second node, wherein the first node is connected to the second node by at least one connecting structure.

10. The light-weight high-strength compressor component of claim 1, wherein each cell of the plurality of cells of the lattice structure has a maximum average dimension of greater than or equal to about 0.1 mm to less than or equal to about 10 mm.

11. The light-weight high-strength compressor component of claim 1, wherein the plurality of cells comprises a first cell having a first maximum average dimension and a second cell having a second maximum dimension, wherein the first maximum average dimension and the second maximum average dimension are distinct from one another to provide a lattice structure having a varying cell density.

12. The light-weight high-strength compressor component of claim 1, wherein each cell of the plurality of cells comprises a solid structure defining one or more void regions therebetween, wherein the one or more void regions comprises loose residual metal particles or an material disposed therein.

13. The light-weight high-strength compressor component of claim 1, wherein each cell of the plurality of cells comprises a solid structure defining one or more void regions therebetween, wherein the solid structure of a first cell of the plurality of cells has a different thickness from a thickness of the solid structure in a second cell of the plurality of cells.

14. The light-weight high-strength compressor component of claim 1, wherein the light-weight, high-strength compressor component is selected from the group consisting of: a bearing housing, a main bearing housing, a lower bearing housing, an orbiting scroll component, a non-orbiting scroll component, a crankshaft, a housing or a shell, a cap, a cover, a separator plate, a muffler plate, an Oldham coupling, a scroll compressor valve, a drive bushing, an interface region between a shell and stator, a roller element, a rotary vane element, a roller element housing, a screw component, a screw, a gate rotor, a centrifugal compressor component, a bearing, a reciprocating component, a piston, a connecting rod, a cylinder head, a compressor body, a discus valve, a discus valve retainer, a valve plate, and combinations thereof.

15. The light-weight high-strength compressor component of claim 1, wherein the at least one fluid delivery feature is configured to retain a lubricant oil until frictional heat generated during operation of the compressor facilitates flow and release of the retained lubricant oil from the at least one fluid delivery feature to a friction surface.

16. A method of making a light-weight, high-strength compressor component having at least one fluid delivery feature comprising:
 applying energy in a predetermined pattern to a powder precursor to create a fused solid structure via an additive manufacturing process, wherein the fused solid structure defines a compressor component having a lattice structure formed in an interior region, wherein the at least one interior region comprises at least one fluid delivery feature comprising a porous region for permitting fluid flow through the interior region of the light-weight, high-strength compressor component, wherein the applying energy forms a porous material in the porous region of the at least one fluid delivery feature.

17. The method of claim 16, wherein the additive manufacturing process is selected from the group consisting of: direct-metal additive manufacturing, direct metal laser sintering (DMLS), selective laser sintering (SLS), selective laser melting (SLM), electron beam melting (EBM), stereolithography (SLA), laminated object manufacturing (LOM), fused deposition modeling (FDM), solid ground curing (SGC), and combinations thereof.

18. The method of claim 16, wherein the powder precursor comprises a material selected from the group consisting of: iron or an iron alloy, aluminum or an aluminum, titanium or a titanium alloy, a metal matrix composite, and combinations thereof.

19. A light-weight high-strength compressor component for a compressor having at least one fluid delivery feature comprising:
  a body portion having at least one interior region that comprises a lattice structure comprising a plurality of cells formed via additive manufacturing and a surface disposed over the lattice structure, wherein the body portion comprises at least one fluid delivery feature to facilitate fluid flow through the body portion of the light-weight, high-strength compressor component, wherein at least one surface region of the at least one fluid delivery feature comprises a coating.

20. The light-weight high-strength compressor component of claim 19, wherein the coating is an omniphilic coating or an omniphobic coating.

21. The light-weight high-strength compressor component of claim 19, wherein the coating comprises an additive to be transferred to the fluid as it passes through the at least one fluid delivery feature.

22. The light-weight high-strength compressor component of claim 19, wherein the fluid comprises lubricant oil and the additive is either a wear-enhancing additive for the lubricant oil or a wear-reducing additive for the lubricant oil.

* * * * *